(12) United States Patent
Rhinesmith et al.

(10) Patent No.: US 7,819,932 B2
(45) Date of Patent: Oct. 26, 2010

(54) METHOD AND SYSTEM FOR GENERATING HYDROGEN-ENRICHED FUEL GAS FOR EMISSIONS REDUCTION AND CARBON DIOXIDE FOR SEQUESTRATION

(75) Inventors: R. Bret Rhinesmith, Sheridan, WY (US); Kimberly R. Gerard, Salt Lake City, UT (US); Kindra Snow-McGregor, Parker, CO (US); Michael W. Conder, Highlands Ranch, CO (US); Patrick Dixon, Denver, CO (US); Frank Jarrett, Littleton, CO (US)

(73) Assignee: Carbon Blue-Energy, LLC, Sheridan, WY (US)

( * ) Notice: Subject to any disclaimer, the term of this patent is extended or adjusted under 35 U.S.C. 154(b) by 380 days.

(21) Appl. No.: 12/101,087

(22) Filed: Apr. 10, 2008

(65) Prior Publication Data

US 2009/0255181 A1 Oct. 15, 2009

(51) Int. Cl.
*B01J 7/00* (2006.01)
*H01M 8/06* (2006.01)
*C01B 3/36* (2006.01)
*C10J 3/46* (2006.01)
*C10J 3/54* (2006.01)
*B01D 53/14* (2006.01)
*B01D 53/56* (2006.01)
*B01D 47/00* (2006.01)

(52) U.S. Cl. .................. 48/197 R; 48/61; 423/226; 95/236

(58) Field of Classification Search ............. 48/197 R, 48/61; 423/226; 95/236
See application file for complete search history.

(56) References Cited

U.S. PATENT DOCUMENTS

| 2,956,093 | A | 10/1960 | Nicolai |
| 3,418,082 | A | 12/1968 | Ter Haar |
| 3,759,679 | A | 9/1973 | Franz et al. |
| 3,977,203 | A | 8/1976 | Hinton et al. |
| 4,171,258 | A | 10/1979 | Gaspar |
| 4,238,468 | A | 12/1980 | Bonacci et al. |
| 4,242,104 | A | 12/1980 | Frost et al. |
| 4,246,015 | A | 1/1981 | Styring, Jr. |
| 4,311,495 | A | 1/1982 | Styring, Jr. |
| 4,383,837 | A | 5/1983 | Smith |
| 4,496,371 | A | 1/1985 | Urban et al. |

(Continued)

OTHER PUBLICATIONS

Ecobridge, Causes of Global Warming, http://www.ecobridge.org/content/g_ese.htm.

(Continued)

*Primary Examiner*—Alexa D Neckel
*Assistant Examiner*—Matthew J Merkling
(74) *Attorney, Agent, or Firm*—Antoinette M. Tease

(57) ABSTRACT

A method of generating hydrogen-enriched fuel gas and carbon dioxide comprising converting hydrocarbon molecules from a gaseous hydrocarbon feed stream into hydrogen and carbon dioxide, separating the hydrogen and carbon dioxide, blending the hydrogen back into the gaseous hydrocarbon feed stream to generate a hydrogen-enriched fuel gas, and utilizing the carbon dioxide for storage or sequestration. A system for generating hydrogen-enriched fuel gas and carbon dioxide comprising an inlet handling system, a syngas and water-gas shift system, a water-gas compression system, a carbon dioxide recovery system, a dehydration system, and a carbon dioxide compression system.

18 Claims, 9 Drawing Sheets

U.S. PATENT DOCUMENTS

| | | | |
|---|---|---|---|
| 4,561,869 A * | 12/1985 | Gazzi et al. | 62/635 |
| 4,623,371 A | 11/1986 | Mehra | |
| 4,710,362 A | 12/1987 | Nieh | |
| 5,139,002 A * | 8/1992 | Lynch et al. | 123/575 |
| 5,358,696 A | 10/1994 | Jahnke | |
| 5,411,721 A | 5/1995 | Doshi et al. | |
| 5,516,967 A | 5/1996 | Pandey et al. | |
| 5,660,602 A | 8/1997 | Collier, Jr. et al. | |
| 5,714,657 A | 2/1998 | deVries | |
| 5,716,587 A | 2/1998 | Khanmamedov | |
| 5,725,616 A | 3/1998 | Lynum et al. | |
| 5,741,440 A | 4/1998 | Cooper et al. | |
| 5,753,010 A | 5/1998 | Sircar et al. | |
| 5,906,673 A | 5/1999 | Reinhold, III et al. | |
| 6,085,549 A | 7/2000 | Daus et al. | |
| 6,128,919 A | 10/2000 | Daus et al. | |
| 6,162,267 A | 12/2000 | Priegnitz et al. | |
| 6,203,587 B1 | 3/2001 | Lesieur et al. | |
| 6,395,197 B1 | 5/2002 | Detering et al. | |
| 6,419,888 B1 | 7/2002 | Wyckoff | |
| 6,500,241 B2 | 12/2002 | Reddy | |
| 6,521,143 B1 | 2/2003 | Genkin et al. | |
| 6,572,680 B2 | 6/2003 | Baker et al. | |
| 6,579,341 B2 | 6/2003 | Baker et al. | |
| 6,619,333 B2 | 9/2003 | Swanson | |
| 6,632,266 B2 | 10/2003 | Thomas et al. | |
| 6,663,841 B2 | 12/2003 | Salma et al. | |
| 6,667,022 B2 | 12/2003 | Cole | |
| 6,669,917 B2 | 12/2003 | Lyon | |
| 6,683,841 B2 | 1/2004 | Lin | |
| 6,743,829 B2 | 6/2004 | Fischer-Calderon et al. | |
| 6,805,195 B2 | 10/2004 | Vinegar et al. | |
| 6,821,501 B2 | 11/2004 | Matzakos et al. | |
| 6,858,049 B2 | 2/2005 | Mittricker | |
| 6,896,717 B2 | 5/2005 | Pinnau et al. | |
| 6,899,859 B1 * | 5/2005 | Olsvik | 423/437.1 |
| 6,911,057 B2 | 6/2005 | Lyon | |
| 6,923,258 B2 | 8/2005 | Wellington et al. | |
| 6,927,048 B2 | 8/2005 | Verser et al. | |
| 7,097,675 B2 | 8/2006 | Detering et al. | |
| 7,160,534 B2 | 1/2007 | Hagemeyer et al. | |
| 7,220,502 B2 | 5/2007 | Galloway | |
| 7,264,788 B2 | 9/2007 | Hampden-Smith et al. | |
| 7,267,811 B2 | 9/2007 | Hampden-Smith et al. | |
| 7,282,189 B2 | 10/2007 | Zauderer | |
| 7,294,327 B2 | 11/2007 | McClanahan et al. | |
| 2002/0073845 A1 | 6/2002 | Reddy | |
| 2002/0098132 A1 * | 7/2002 | Vidalin | 422/188 |
| 2002/0189443 A1 | 12/2002 | McGuire | |
| 2003/0035770 A1 | 2/2003 | Cole | |
| 2003/0068260 A1 | 4/2003 | Wellington et al. | |
| 2003/0068269 A1 | 4/2003 | Matzakos et al. | |
| 2003/0077771 A1 | 4/2003 | Verser et al. | |
| 2003/0131726 A1 | 7/2003 | Thomas et al. | |
| 2003/0136146 A1 | 7/2003 | Fischer-Calderon et al. | |
| 2003/0188536 A1 | 10/2003 | Mittricker | |
| 2003/0196789 A1 | 10/2003 | Wellington et al. | |
| 2003/0198585 A1 | 10/2003 | Salma et al. | |
| 2003/0201098 A1 | 10/2003 | Karanikas et al. | |
| 2004/0015023 A1 | 1/2004 | Wellington et al. | |
| 2004/0050250 A1 | 3/2004 | Pinnau et al. | |
| 2004/0061094 A1 | 4/2004 | Lyon | |
| 2004/0200618 A1 | 10/2004 | Piekenbrock | |
| 2005/0002847 A1 | 1/2005 | Maroto-Valer et al. | |
| 2005/0193764 A1 | 9/2005 | Mittricker | |
| 2007/0099038 A1 | 5/2007 | Galloway | |
| 2007/0108096 A1 * | 5/2007 | Egan et al. | 208/15 |
| 2007/0175096 A1 | 8/2007 | Calderon et al. | |
| 2007/0181083 A1 * | 8/2007 | Fulton et al. | 123/3 |
| 2007/0186472 A1 | 8/2007 | Rabovitser et al. | |
| 2007/0221541 A1 | 9/2007 | McClanahan et al. | |
| 2007/0227352 A1 | 10/2007 | Kumar | |
| 2007/0232706 A1 | 10/2007 | Shah et al. | |

OTHER PUBLICATIONS

Virginia Department of Mines Minerals and Energy, Glossary of Terms, http://www.dmme.virginia.gov/DE/glossaryterms.shtml, 2006.

* cited by examiner

METHOD AND SYSTEM FOR GENERATING HYDROGEN-ENRICHED FUEL GAS FOR EMISSIONS REDUCTION AND CARBON DIOXIDE FOR SEQUESTRATION

BACKGROUND OF THE INVENTION

1. Field of the Invention

The present invention relates generally to the field of oil and gas, and more specifically, to a method and system for generating hydrogen-enriched fuel gas for emissions reduction and carbon dioxide for sequestration.

2. Description of the Related Art

Climate change resulting in global warming from increased greenhouse gas (GHG) concentration in the atmosphere has been a problem for many years, and the recent accelerated increase in GHG concentration in the atmosphere and the associated climatic impacts identified around the work has been alarming. The anthropogenic (man-made) causes of global warming include carbon dioxide emissions into the atmosphere from hydrocarbon fuel combustion, including, but not limited to, electrical power generation facilities, vehicles, railroad locomotives, ships, airplanes, petrochemical, manufacturing, industrial and commercial industries; methane derived from agricultural sources (e.g., rice paddies, bovine flatulence, etc.), biomass (human waste, animal waste, and agricultural waste), and hydrocarbon fuel production; increased water vapor in the atmosphere from hydrocarbon fuel combustion; nitrous oxide from hydrocarbon fuel combustion; and deforestation, which releases hundreds of millions of tons of carbon dioxide into the atmosphere each year. [1] According to the United Nations Intergovernmental Panel on Climate Change (IPCC), it is projected that global warming will cause dry areas to get drier, drought-affected areas to become larger, an increase in heavy precipitation events, and a decrease in water supply stored in glaciers and snow pack. In addition, coastal areas will be exposed to coastal erosion and sea-level rise, and many millions more people will be flooded every year due to sea-level rise by the 2080s. [2]

Hydrocarbon fuel combustion emissions are a major contributor to GHG concentrations that impact climate change and result in global warming. It has been documented that hydrogen-enriched fuel decreases emissions. [3, 4] The problem that has not been solved, however, is how to produce and develop a hydrogen-based infrastructure. Most of the debate surrounding this issue involves developing a pure hydrogen product that eliminates carbon dioxide emissions from combustion of the fuel. Developing a blended hydrogen and pipeline quality natural gas product that utilizes the existing pipeline transportation and distribution system would reduce emissions from industrial, commercial, residential and mobile natural gas consumers. This problem presents challenges that heretofore have not been solved by the prior art. The present invention offers a solution to this problem by providing a method and system: converting the hydrocarbon molecules to hydrogen and carbon dioxide; separating the hydrogen and carbon dioxide; storing, sequestering or utilizing the carbon dioxide so that it is not emitted into the atmosphere; and blending the hydrogen back into the natural gas and/or using the hydrogen as fuel. In a preferred embodiment, a carbon dioxide recovery solvent is used to separate the carbon dioxide from the hydrogen, which has the advantage of allowing the separation step to deliver the hydrogen and carbon dioxide at high pressure, thereby reducing the cost and energy usage of compressing and transporting carbon dioxide downstream systems and the hydrogen back to the natural gas pipeline. The carbon dioxide recovery solvent also significantly lowers circulation rates when compared to conventional physical and chemical solvents, thereby reducing the energy required and size of equipment needed to implement the process.

The term "carbon sequestration" generally refers to the long-term storage of carbon in a multitude of means, including, but not limited to, terrestrial, underground, or ocean environments to reduce the buildup of carbon dioxide in the atmosphere. [5] One method of containing carbon dioxide—called "geologic sequestration"—is to inject it into geologic formations (e.g., coal beds, petroleum formations, saline aquifers, basalt formations, etc.). Enhanced oil recovery (EOR), a form of geologic sequestration, is the process by which carbon dioxide and sometimes water are injected into oil reservoirs, thereby flushing out reserves of oil that would otherwise remain unrecovered. This process can extend the life of an oil reservoir by years, and in some cases, produce many millions of barrels of extra oil without causing substantial additional impacts to the surface and eliminating or delaying the expansion of oil exploration into sensitive areas. [6] In a preferred embodiment of the present invention, the carbon dioxide that is recovered as part of the present invention is used in EOR operations.

Current technologies for capturing carbon from fossil fuels generally fall into two categories: pre-combustion and post-combustion. To date, pre-combustion technologies have been limited to removal of carbon dioxide from coals, natural gas or syngas immediately prior to combustion. Though many plants have been proposed to deliver the captured carbon dioxide for eventual sequestration, no commercial plants have been constructed to date. Prior art post-combustion technologies are limited to removing carbon dioxide from low-pressure (near atmospheric) flue gases using chemical amine-based solvents or chilled ammonium bicarbonate solvent. These applications typically require high solvent circulation rates, high thermal energy requirements, and often have problems caused by oxygen contamination and high flue gas temperatures. In addition, the delivery pressure of the carbon dioxide from said prior art systems is limited to 5-10 psig (pound-force per square inch gauge), which requires high energy consumption due to compressing the carbon dioxide for sequestration in geological storage reservoirs or for use for carbon dioxide EOR.

Furthermore, much of the prior art deals with carbon capture and sequestration at point sources (e.g., individual stationary facilities); however, most point sources generate relatively small amounts of carbon dioxide that are not of sufficient quantities to support EOR and other types of geologic sequestration. To overcome this limitation, carbon dioxide compression and pipeline networks need to be constructed to aggregate carbon dioxide volumes from point sources, which is only practical for large industrial point sources. The present invention avoids this problem by generating carbon dioxide not at a point source but at a strategically located hydrogen generation plant on the main pipeline (well upstream of the point sources), preferably located in an area that would both geologically support either carbon dioxide storage/sequestration or carbon dioxide EOR injection. In this manner, sufficient quantities of carbon dioxide can be produced to make carbon capture and storage/sequestration economically feasible.

BRIEF SUMMARY OF THE INVENTION

The present invention is a method of generating hydrogen-enriched fuel gas and carbon dioxide comprising: converting hydrocarbon molecules from a gaseous hydrocarbon feed stream into hydrogen and carbon dioxide; separating the hydrogen and carbon dioxide; blending the hydrogen back into the gaseous hydrocarbon feed stream to generate a hydrogen-enriched fuel gas; and utilizing the carbon dioxide for storage or sequestration. In a preferred embodiment, each standard cubic foot of the gaseous hydrocarbon feed stream produces between two and four standard cubic feet of a hydrogen product stream and between 0.7 and 0.9 standard cubic feet of a carbon dioxide product stream. Preferably, the hydrogen-enriched fuel gas has a hydrogen concentration ranging from five to 30 mole percent.

In a preferred embodiment, the hydrogen-enriched fuel gas produces less carbon dioxide per energy unit output when combusted than non-hydrogen-enriched natural gas. Preferably, approximately one to eleven percent of the gaseous hydrocarbon feed stream is processed.

In a preferred embodiment, the total volume of the gaseous hydrocarbon feed stream ranges from 100 million standard cubic feet per day to 4500 million standard cubic feet per day, and between 10 million standard cubic feet per day and 500 million standard cubic feet per day of the gaseous hydrocarbon feed stream is processed. Preferably, the hydrogen-enriched fuel gas is transported and distributed using the existing natural gas pipeline system. In a preferred embodiment, the sequestration is enhanced oil recovery.

In a preferred embodiment, the carbon dioxide is separated from the hydrogen using a carbon dioxide recovery solvent, and the carbon dioxide recovery solvent is one or more hydrocarbon liquid(s) selected from the group consisting of butanes, pentanes, hexanes, heptanes, octanes, aromatics, and isomers of butanes, pentanes, hexanes, heptanes, octanes and aromatics. Preferably, the carbon dioxide recovery solvent is normal-butane or a mixture of normal-butane and iso-butane. In a preferred embodiment, the carbon dioxide recovery solvent allows the carbon dioxide to be separated from the hydrogen at a pressure of between 200 and 500 psig.

In a preferred embodiment, total carbon dioxide compression requirements for the storage or sequestration are reduced by 50 to 75 percent as compared to chemical or physical solvent-based carbon dioxide recovery processes that do not utilize the carbon dioxide recovery solvent of the present invention. Preferably, the conversion, separation and blending steps occur on a natural gas transportation and distribution pipeline and not at a point of combustion. In a preferred embodiment, the conversion, separation and blending steps are all performed prior to combustion of the hydrogen-enriched fuel gas.

In a preferred embodiment, the conversion, separation and blending steps do not require any changes to the existing natural gas pipeline transportation and distribution system other than providing mobile points of consumption with an ability to consume the hydrogen-enriched fuel gas and increasing the number of compressed natural gas fueling facilities to supply the mobile points of consumption with the hydrogen-enriched fuel gas. Preferably, the gaseous hydrocarbon feed stream is pipeline quality natural gas. In a preferred embodiment, the present invention further comprises utilizing a portion of the separated hydrogen as a separate fuel product.

In an alternate embodiment, the present invention is a method of generating hydrogen and carbon dioxide comprising: converting hydrocarbon molecules from a gaseous hydrocarbon feed stream into hydrogen and carbon dioxide; separating the hydrogen and carbon dioxide; utilizing the hydrogen as a separate product; and utilizing the carbon dioxide for storage or sequestration; wherein the carbon dioxide is separated from the hydrogen using a carbon dioxide recovery solvent; and wherein the carbon dioxide recovery solvent is one or more hydrocarbon liquid(s) selected from the group consisting of butanes, pentanes, hexanes, heptanes, octanes, aromatics, and isomers of butanes, pentanes, hexanes, heptanes, octanes and aromatics. Preferably, the carbon dioxide recovery solvent is normal-butane or a mixture of normal-butane and iso-butane. In a preferred embodiment, the carbon dioxide recovery solvent allows the carbon dioxide to be separated from the hydrogen at a pressure of between 200 and 500 psig.

The present invention is also a system for generating hydrogen-enriched fuel gas and carbon dioxide comprising: an inlet handling system; a syngas and water-gas shift system; a water-gas compression system; a carbon dioxide recovery system; a dehydration system; and a carbon dioxide compression system; wherein the inlet handling system prepares a gaseous hydrocarbon feed stream having a pressure and a temperature to be fed to the syngas and water-gas shift system by removing liquids and solids, reducing the pressure of the gaseous hydrocarbon feed stream, and maintaining the temperature of the gaseous hydrocarbon stream for downstream processes; wherein the syngas and water-gas shift system produces hydrogen-bearing syngas by reforming the gaseous hydrocarbon feed stream into hydrogen and carbon monoxide and then converts the carbon monoxide to carbon dioxide, thereby producing a water-gas stream; wherein the carbon dioxide recovery system has an operating pressure; wherein the water-gas compression system compresses the water-gas stream from the syngas and water-gas shift system to the operating pressure of the carbon dioxide recovery system; wherein the carbon dioxide recovery system separates the carbon dioxide from the hydrogen contained in the water-gas stream produced by the syngas and water-gas shift system; wherein the dehydration system removes water vapor present in the water-gas stream produced by the syngas and water-gas shift system, thereby recovering additional carbon dioxide; and wherein the carbon dioxide compression system compresses the carbon dioxide recovered from the water-gas stream by the carbon dioxide recovery system and the dehydration system to a carbon dioxide delivery pressure.

In a preferred embodiment, the carbon dioxide that is compressed by the carbon dioxide compression system is used in a particular sequestration process that has a required delivery pressure, and the carbon dioxide delivery pressure is determined by the required delivery pressure of the sequestration process for which the carbon dioxide is used. Preferably, the sequestration process is enhanced oil recovery. In a preferred embodiment, the gaseous hydrocarbon feed stream is pipeline quality natural gas.

In a preferred embodiment, the carbon dioxide recovery system separates the carbon dioxide from the hydrogen contained in the water-gas stream produced by the syngas and water-gas shift system using a carbon dioxide recovery solvent that is one or more hydrocarbon liquid(s) selected from the group consisting of butanes, pentanes, hexanes, octanes, aromatics, and isomers of butanes, pentanes, hexanes, heptanes, octanes and aromatics. Preferably, the carbon dioxide recovery solvent is normal-butane or a mixture of normal-butane and iso-butane. In a preferred embodiment, the carbon dioxide recovery solvent allows the carbon dioxide to be separated from the hydrogen at a pressure of between 200 and 500 psig.

In an alternate embodiment, the present invention is a system for generating hydrogen-enriched fuel gas and carbon dioxide comprising: means for converting hydrocarbon molecules from a gaseous hydrocarbon feed stream into hydrogen and carbon dioxide; means for separating the hydrogen and carbon dioxide; means for blending the hydrogen back into the gaseous hydrocarbon feed stream to generate a hydrogen-enriched fuel gas; and means for utilizing the carbon dioxide for storage or sequestration.

REFERENCE NUMBERS

Figure 1:
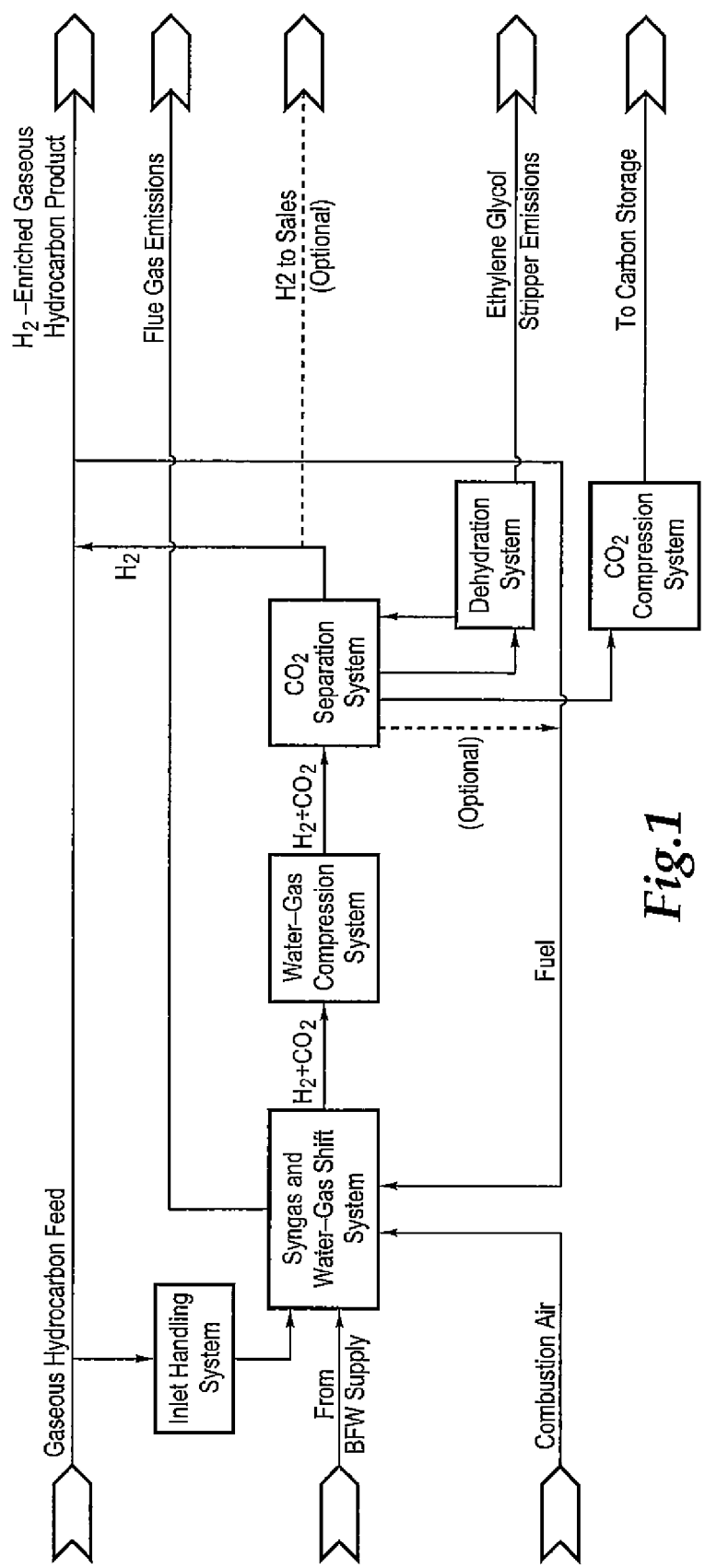
FIG. 1 is a flow diagram illustrating the overall process of the present invention, including the six systems that comprise the present invention.

1 Inlet filter separator
2 Feed gas heater
3 Pressure let-down device
4 Flue gas stack
5 Induced draft combustion air blower
6 Desulfurization heater
7 Combustion air pre-heater
8 Pre-reformer pre-heater
9 Reformer pre-heater
10 Flue gas cooler
11 High-temperature shift reactor feed cooler
12 High-temperature shift reactor
13 First low-temperature shift reactor feed cooler
14 Second low-temperature shift reactor feed cooler
15 Low-temperature shift reactor
16 Product gas cooler
17 Desulfurization bed
18 Pre-reformer
19 Reformer
20 Water-gas compression inlet cooler
21 Water-gas compression first stage suction scrubber
22 Water-gas compression first stage compressor
23 Water-gas compression first stage inter-cooler
24 Wager-gas compression second stage suction scrubber
25 Water-gas compression second stage compressor
26 Water-gas compression second stage cooler
27 Water-gas compression discharge knock-out drum
28 Gas/gas exchanger
29 Presaturator separator
30 Presaturator pump
31 High-level gas chiller
32 Low-level gas chiller
33 Presaturator chiller
34 Glycol separator
35 Ethylene glycol exchanger
36 Primary absorber
37 Flash gas compressor
38 Flash gas compressor suction scrubber
39 Flash absorber
40 Low-level solvent chiller
41 High-level solvent chiller
42 Ethylene glycol heater
43 Ethylene glycol flash separator
44 Solvent cross exchanger
45 Solvent charge pump
46 Solvent stripper
47 Solvent stripper reflux pump
48 Solvent stripper reboiler
49 Solvent stripper reflux condenser
50 Solvent stripper reflux accumulator
51 Refrigerant subcooler
52 Refrigerant condenser
53 Refrigerant compressor first stage suction scrubber
54 First stage refrigerant compressor
55 Second stage refrigerant compressor
56 Refrigerant second stage economizer
57 Refrigerant first stage economizer
58 Refrigerant accumulator
59 Carbon dioxide compressor suction scrubber
60 Carbon dioxide compressor
61 Carbon dioxide compressor discharge cooler
62 Third stage refrigerant compressor As used in the figures, "LP" means low-pressure. "HP" means high-pressure. "BFW" means boiler feed water. "CW" means cooling water. "EG" means ethylene glycol. "ATM" means atmosphere.

DETAILED DESCRIPTION OF INVENTION

A. Overview

The present invention is a method and system by which a portion of a gaseous hydrocarbon feed stream is converted into hydrogen and carbon dioxide products. In a preferred embodiment, each standard cubic foot (SCF) of gaseous hydrocarbon feed produces between two and four SCF of a hydrogen product stream and between 0.7 and 0.9 SCF of a carbon dioxide product stream. The hydrogen product is then blended with the balance of the gaseous hydrocarbon stream to produce a hydrogen-enriched fuel gas. In an alternate embodiment, pure hydrogen is also a product. The carbon dioxide product stream is in a form suitable for storage or sequestration.

In a preferred embodiment, the hydrogen-enriched fuel gas stream produced by the present invention has a hydrogen concentration ranging from five to 30 mole percent. To achieve these blends, approximately one to eleven percent of the total gaseous hydrocarbon stream is processed. The present invention is preferably designed to process between 10 million standard cubic feet per day (MMSCFD) and 500 MMSCFD of a gaseous hydrocarbon feed stream out of a total gaseous hydrocarbon stream ranging between 100 MMSCFD and 4500 MMSCFD, respectively, to obtain the desired enriched fuel gas compositions.

FIG. 1 provides an overview of the present invention. The present invention is a method and system designed to separate a portion of a natural gas or methane-rich stream; to convert the smaller portion of these streams into a mixed hydrogen/carbon dioxide stream; to separate the hydrogen from the carbon dioxide using a carbon dioxide recovery solvent whose physical properties allow the delivery pressure of the captured carbon dioxide to be uniquely high without the use of gas compression; to take advantage of this high carbon dioxide delivery pressure to reduce the total carbon dioxide compression requirements for EOR or geological storage/sequestration by 50 to 75 percent when compared to prior art chemical or physical solvent-based carbon dioxide recovery processes; and to reblend the resulting hydrogen-rich stream with larger portion of the original natural gas or methane-rich stream, making a gas that will produce less carbon dioxide per energy unit output when combusted than the original natural gas or methane-rich stream would produce.

The present invention is comprised of six separate systems. The inlet handling system prepares the gaseous hydrocarbon stream to be fed to the syngas and water-gas shift system by removing liquids and solids, reducing the pressure of the gaseous hydrocarbon stream, and maintaining the temperature of the gaseous hydrocarbon stream for downstream processes. The syngas and water-gas shift system produces hydrogen-bearing syngas by the reforming of a gaseous hydrocarbon feed stream into mainly hydrogen and carbon monoxide and then "shifting" the carbon monoxide to carbon dioxide (the mixture commonly known as "water-gas"). The water-gas compression system compresses the resulting water-gas stream from the syngas and water-gas shift system to the operating pressure of the carbon dioxide recovery system. The carbon dioxide recovery system separates the carbon dioxide from the hydrogen-rich synthesis/shifted gas stream. The dehydration system removes the water vapor remaining from the production of the water-gas stream (by the syngas and water-gas shift system) to a level that is acceptable for the carbon dioxide recovery system and the product specifications of the hydrogen-enriched gas stream and the carbon dioxide product. The carbon dioxide compression system compresses the recovered carbon dioxide product streams from both the carbon dioxide recovery system and the dehydration system to the final carbon dioxide delivery pressure as required for storage/sequestration in geological storage reservoirs or for use for carbon dioxide EOR.

The present invention is described more fully below in connection with the six systems that comprise the present invention: inlet handling, synthesis gas (syngas) and water-gas shift, water-gas compression, carbon dioxide recovery, dehydration, and carbon dioxide compression.

B. Inlet Handling System

Figure 2:
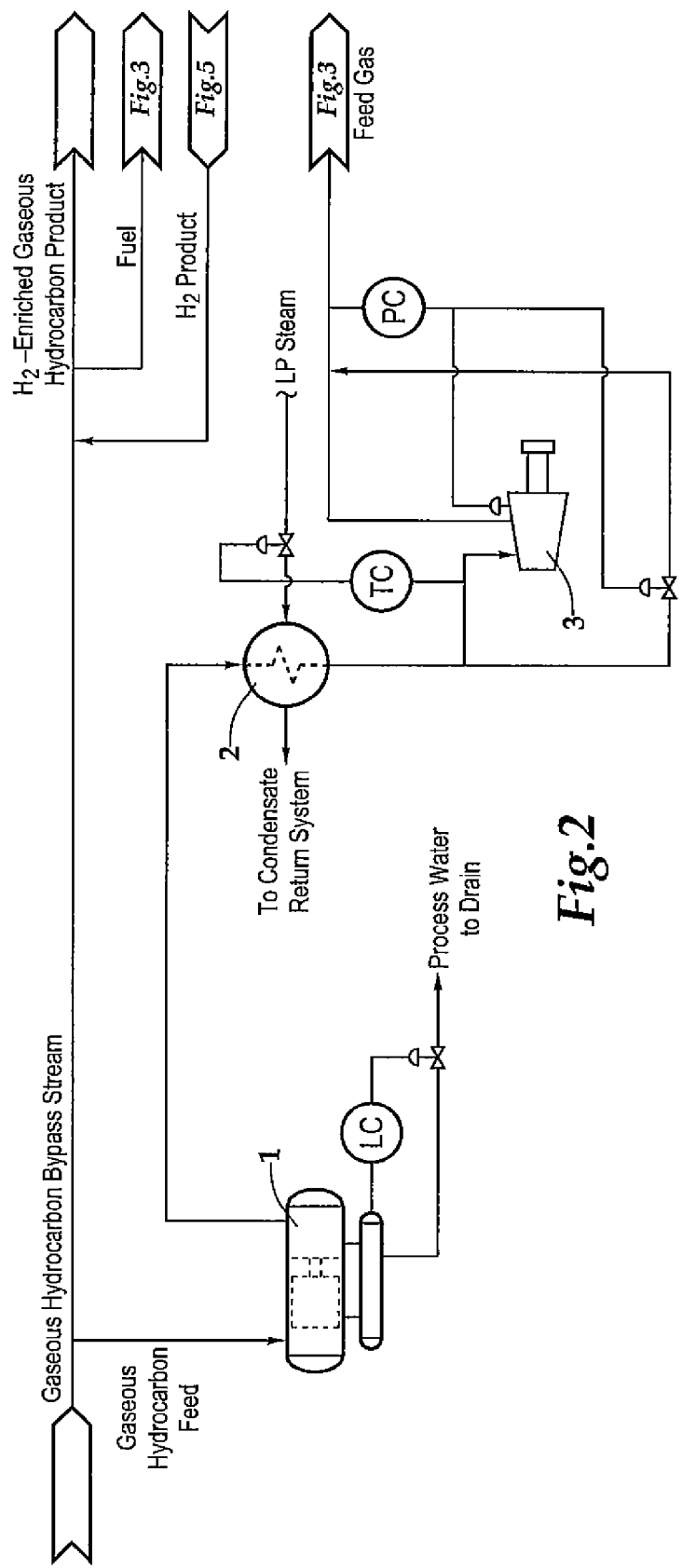
FIG. 2 is a flow diagram of the inlet handling system of the present invention.

FIG. 2 is a flow diagram of the inlet handling system of the present invention. The inlet handling system prepares the gaseous hydrocarbon stream to be fed to the syngas and water-gas shift system by removing liquids and solids, and both reducing the pressure and maintaining the temperature of said gaseous hydrocarbon stream for downstream processes. The present invention is designed to accept hydrocarbon feeds with carbon dioxide concentrations of between 0 and 20 $CO_2$ mole percent; with hydrogen sulfide concentrations of between 0 and 1 grain per 100 standard cubic feet (SCF); and with water vapor contents of between 0% and full saturated. In a preferred embodiment, other gas qualities can be handled by installing traditional gas processing and conditioning processes that enable a wider range of gas compositions, and the present invention can be modified to address a variety of conditions. The range of operating pressures of acceptable feed gas streams is from 0 psig to 2200 psig. The range of temperatures of acceptable feed gas streams is from ambient conditions to 300° F.

Referring to FIG. 2, a gaseous hydrocarbon stream is split into a greater stream and a lesser stream. The greater stream flows to the outlet of the present invention as the gaseous hydrocarbon bypass stream, while the lesser stream, the gaseous hydrocarbon feed, flows to the inlet handling system of the present invention.

The inlet handling system is comprised of an inlet filter separator 1, a feed gas heater 2, and a pressure let-down device 3. The inlet filter separator 1 removes any potential free liquids (such as water, hydrocarbons and other impurities such as hydrate inhibitors (methanol, ethylene glycol and tri-ethylene glycol), lube oil, corrosion inhibitors, processing chemicals (amine, potassium, carbonates, etc.), etc.) and solid particulates (such as mill scale, rust, welding slag, dirt, sand, dust, etc.) in the gaseous hydrocarbon feed prior to the gas flowing to the feed gas heater 2. Any accumulated liquids are dumped to a high-pressure drain system for disposal or recycling.

The filtered gaseous hydrocarbon feed then flows to the feed gas heater 2. The feed gas heater cross-exchanges the feed gas with low-pressure steam (50 psig) or other heat medium. The steam or other heat medium flows to the gaseous hydrocarbon feed gas heater 2, where either latent heat (steam that is condensed) or sensible heat (heat medium that is cooled while the feed gas is heated) is used to increase the temperature of the feed gas. When steam is used as the heat medium, the steam condensate flows from the feed gas heater 2 to a feed heater condensate pot (not shown), where it is collected and recycled to a low-pressure condensate system (not shown) for reuse in steam production. The outlet gas temperature of the feed gas from the feed gas heater 2 is controlled to 260° F. or other temperature necessary to maintain the heat of the feed gas downstream of the pressure let-down device. The heated gaseous hydrocarbon feed then flows to the inlet of the pressure let-down device 3, where the gas pressure is reduced from approximately 1220 psia (pounds-force per square inch absolute) to 420 psia. The pressure let-down device may be an expansion valve (also known as a Joules-Thomson of JT valve) and/or expansion turbine (turbo-expander). Turbo-expanders are isentropic machines that may include expander/compressors, expander/generators, and expander/brakes. The energy from the turbo-expander is utilized to gain higher efficiency within the processing plant by recovering the pressure energy as either mechanical energy or to generate electrical power.

The inlet handling system described above and the synthesis gas and water-gas shift system described below are both based upon steam reforming. The present invention, however, is not limited to any particular type of reforming method. If an alternative reforming technology is used, such as autothermal reforming or partial oxidation reforming, the pressure let-down device 3 can be used to supply the low-temperature cooling energy for use in an air separation unit or other heat integration methods. The air separation unit would be used to obtain a nearly pure oxygen feed stream in the alternate reformer reaction. The pressure let-down device 3 could also be used as a power source for a separate piece of rotating equipment, such as a large pump or compressor anywhere within the present invention. Alternately, the pressure let-down device 3 could be eliminated and replaced with an expansion valve such as a control valve or choke.

C. Synthesis Gas and Water-Gas Shift System

Figure 3:
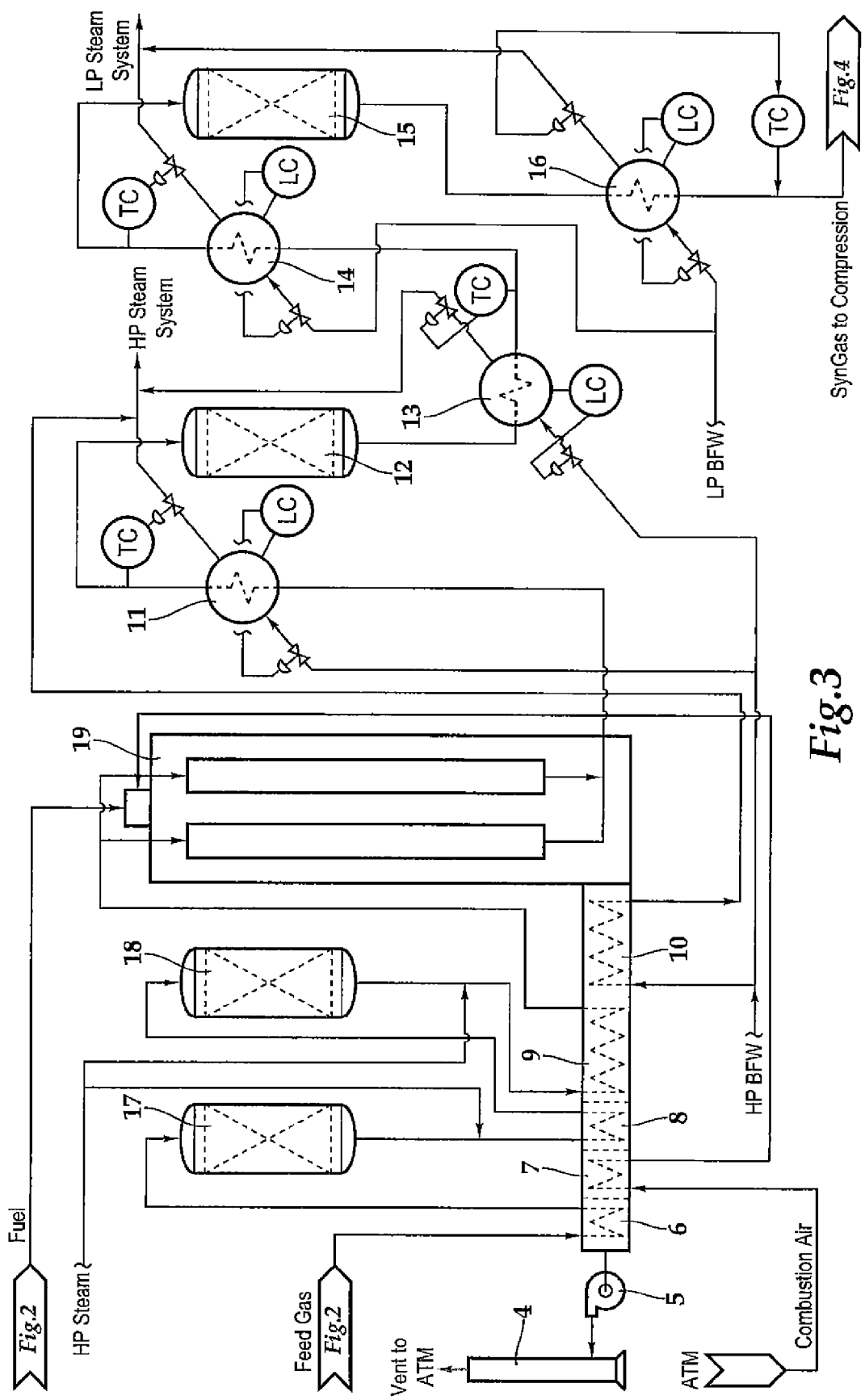
FIG. 3 is a flow diagram of the synthesis gas and water-gas shift system of the present invention.

FIG. 3 is a flow diagram of the synthesis gas and water-gas shift system of the present invention. In a preferred embodiment, the syngas and water-gas shift system is based on steam reforming, but the present invention is not limited to this particular method. Alternate technologies, such as autothermal reforming and partial oxidation reforming, could be used in lieu of steam reforming to create syngas (also called synthesis gas, which is a mixture of mainly hydrogen and carbon monoxide with other compounds including nitrogen, methane, carbon dioxide and water vapor). All of these methods—steam reforming, autothermal reforming and partial oxidation reforming—are known to those skilled in the art of petrochemical engineering.

The syngas produces hydrogen by the catalytic oxidation of a gaseous hydrocarbon feed stream. With steam reforming, the hydrocarbon gas stream is heated, mixed with steam and passed over the catalytic beds of a pre-reformer and a reformer. At the high operating temperatures of the pre-reformer and reformer, the hydrocarbons will react with steam in the presence of an industry standard, conventional metal-based reforming catalyst to produce hydrogen, carbon monoxide, carbon dioxide and water. The excess energy produced from the furnace of the reformer is recovered and used to produce high-pressure steam; to heat feed streams to the pre-reformer and reformer; to preheat combustion air; and/or to supply energy to other heating services as needed. The water-gas shift reaction converts carbon monoxide to carbon dioxide.

Referring to FIG. 3, the syngas and water-gas shift system is comprised of a desulfurization heater 6, two desulfurization beds 17, a pre-reformer pre-heater 8, a pre-reformer 18, a reformer pre-heater 9, a reformer 19, a flue gas cooler 10, a high-temperature shift reactor (HTSR) feed cooler 11, an HTSR 12, a first low-temperature shift reactor (LTSR) cooler 13, a second LTSR cooler 14, an LTSR 153 a product gas cooler 16, a combustion air pre-heater 7, an induced draft combustion air blower 5, and a flue gas stack 4.

Gaseous hydrocarbon feed from the inlet handling system enters the syngas and water-gas system at 420 psia and 132° F. The feed stream is heated to 350° F. in the desulfurization heater 6. This is the optimum feed temperature for the desulfurization units 17. The gaseous hydrocarbon feed then enters the desulfurization units 17, where any trace amounts of sulfur compounds in the feed stream are removed. Desulfurization of the gaseous hydrocarbon feed is critical because sulfur compounds will poison the metal-based reforming catalyst used in the pre-reformer 18 and reformer 19. In one embodiment, the desulfurization reaction is defined as follows:

$$H_2S_{(v)} + Z_nO_{(s)} \rightarrow Z_nS_{(s)} + H_2O_{(v)}$$

Other desulfurization technologies may be used, however.

High-pressure steam is then mixed with the desulfurized gaseous hydrocarbon feed and pre-heated in the pre-reformer pre-heater 8 to 1,000° F. In the pre-reformer 18, any high molecular weight hydrocarbons are reduced to methane, and a significant portion of the steam-reforming reaction occurs. The present invention is not limited to methane reforming, and other gaseous hydrocarbon feeds may be utilized in the reformer. The steam-reforming reaction is defined as follows:

$$C_nH_{m(v)} + nH_2O + heat \rightarrow nCO_{(v)} + (m/2+n)H_2$$

The partial conversion (steam-reforming reaction) occurs in the pre-reformer 18 at a lower temperature (approximately 1000° F. as compared to approximately 1500° F.) than would otherwise be required in the reformer 19. This lower temperature allows the use of less expensive equipment for the pre-reformer and allows the primary reformer 19 (the most costly item in the syngas system) to be smaller. The effluent gas from the pre-reformer 18 is mixed with additional high-pressure steam and is heated in the reformer pre-heater 9 to 1,115° F.

The resulting heated process gas stream then flows to the primary reformer 19. In the reformer 19, the steam-reforming reaction continues to near equilibrium completion.

The heated process gas stream flows downward through catalyst-filled tubes in the reformer 19. An external top-fired burner in the reformer 19 provides the energy necessary for the steam-reforming reaction to occur in the catalyst-filled tubes. The top-fired unit provides co-current flow for the process gas within the tubes, as well as for the flue gas contained within the flue gas section of the reformer 19. This allows the highest flue gas temperature to be flowing in the location of the coolest in-tube process gas, and it also allows the lowest flue gas temperature to occur where the in-tube process gas is the hottest. This arrangement provides uniform tube-wall temperatures over the entire tube length. The present invention is not limited to the steam-reforming method described above, however, and other reformer layouts are included within the scope of the present invention.

The reformer burner combusts either gaseous hydrocarbon fuel or hydrogen-enriched fuel with pre-heated combustion air. The facility is preferably designed such that once hydrogen production comes on-line, the reformer fuel feed will be switched from the gaseous hydrocarbon feed required to start up the plant to the produced hydrogen-enriched gaseous stream and/or hydrogen produced by the present invention. The combustion air pre-heater 7 heats the combustion air (pulled in from the atmosphere by the induced draft combustion air blower 5 to 280° F. prior to the combustion air being fed to the burner of the reformer 19.

The hot effluent flue gas from the burner of the reformer 19 provides the heat input required for the following heaters: the desulfurization heater 6, the combustion air pre-heater 7, the pre-reformer pre-heater 8, the reformer pre-heater 9, and the flue gas cooler 10. After leaving the reformer, the flue gas then enters the induced draft combustion air blower 5. The induced draft combustion air blower 5 provides the motive force for the combustion air to flow through the reformer 19. From the induced draft combustion air blower 5, the flue gas then enters the bottom of the flue gas stack 4, where the flue gas is vented to atmosphere. The present invention is not limited to this particular combustion air and flue gas arrangement, however, and other process heat integration layouts are included within the scope of the present invention.

The effluent process gas from the reformer 19 enters the HTSR feed cooler 11, where it is cooled from 1588° F. to 700° F. The energy released from the reactor effluent is used to produce high-pressure steam. The steam produced from this cooler is at 450 psig.

The cooled stream is at the optimum feed temperature for the high-temperature shift reaction that occurs in the HTSR 12. In the HTSR 12, the water-gas shift reaction occurs. This reduces the quantity of carbon monoxide present in the reformer effluent stream, thereby increasing the hydrogen and carbon dioxide yield of the process. The water-gas shift reaction is defined as follows:

$$CO_{(v)} + H_2O_{(v)} \rightarrow CO_{2(v)} + H_{2(v)} + heat$$

The effluent from the HTSR 12 is cooled in the first LTSR feed cooler 13, where the effluent is cooled from 813° F. to 415° F. The energy released from cooling the gas stream is used to generate 450 psig steam (steam pressure may range between 300 psig and 600 psig). The gas stream is further cooled to 385° F. in the second LTSR feed cooler 14 to produce 50 psig steam (steam pressure may range between 25 and 75 psig). The cooled gas stream is fed to the LTSR 15, where the water-gas shift reaction continues, thus further increasing the hydrogen yield. The syngas effluent from the LTSR 15 is cooled in the product gas cooler 16, where the syngas effluent is cooled from 423° F. to 320° F. The present invention is not limited to this particular process for cooling the syngas, producing water-gas, and cooling the water-gas, however, and other heat integration arrangements are included within the scope of the present invention.

The cooled syngas stream then flows to the water-gas compression system. Alternately, the carbon dioxide could be recovered from the syngas before the syngas is compressed, if the total equipment capital costs and system operating costs for both the water-gas compression system and the carbon dioxide recovery system would be lower, or if the water-gas compression system were located remotely. In this situation, the syngas stream would be cooled from 320° F. to 90-120° F. (depending upon the type of cooling used—cooling water or air cooler) and flow to the carbon dioxide recovery system before flowing to the water-gas compression system.

D. Water-Gas Compression System

Figure 4:
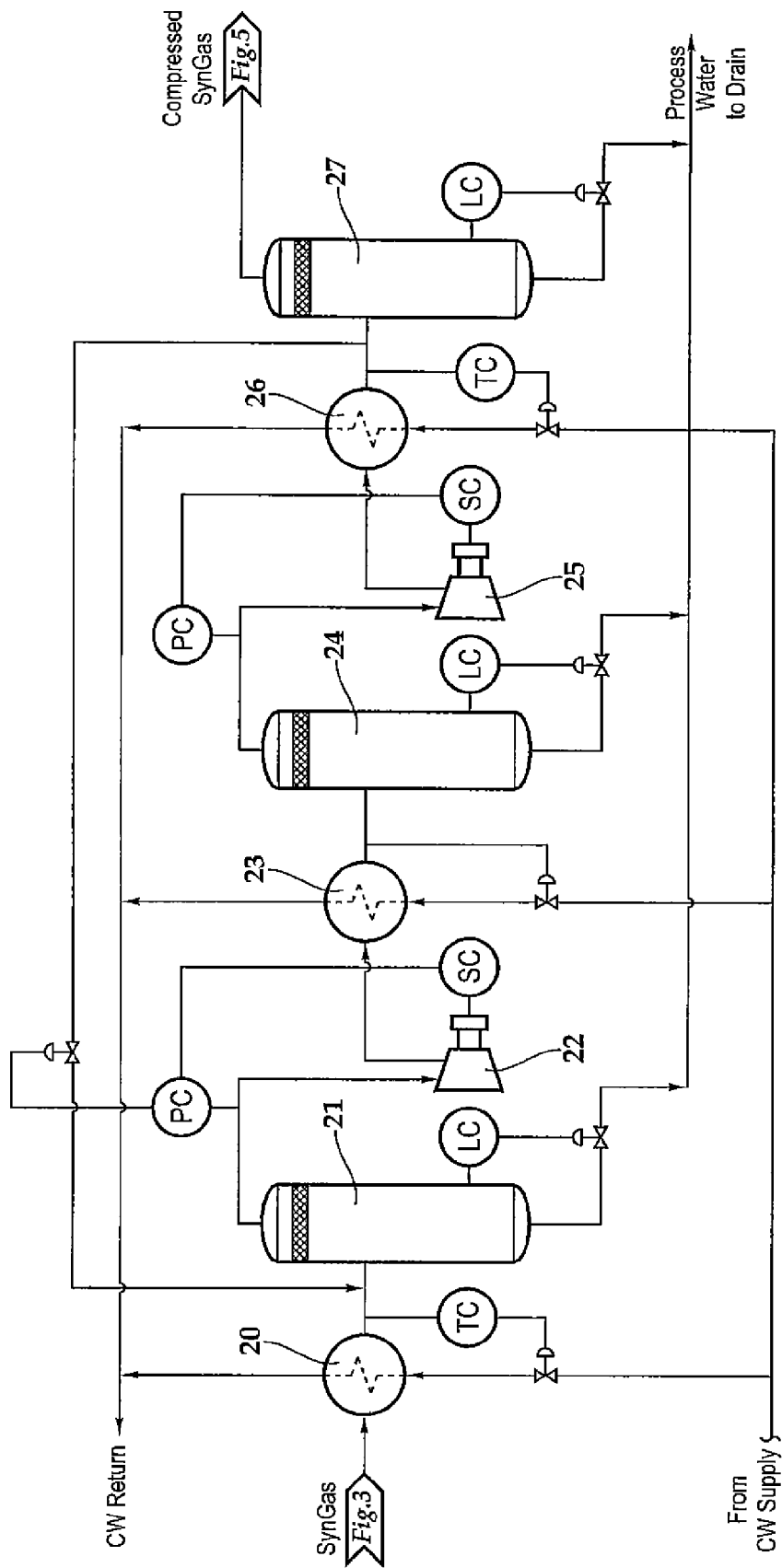
FIG. 4 is a flow diagram of the water-gas compression system of the present invention.

FIG. 4 is a flow diagram of the water-gas compression system of the present invention. The water-gas compression system compresses the water-gas (mixture of mainly hydrogen and carbon dioxide) stream from the syngas and water-gas shift system to the operating pressure of the carbon dioxide recovery system.

The discharge pressures of the water-gas compression system may range from 500 psig to 2200 psig, depending upon the selected operating pressure of the carbon dioxide recovery system and/or the required hydrogen, hydrogen-enriched fuel gas, or carbon dioxide delivery pressures. The final product stream temperature may range from 90° F. to 120° F., depending upon the type of cooling used (e.g., cooling water or air cooler) and sales contract quality specifications. The type of compressors (i.e., centrifugal, reciprocating, etc.) used will be selected based upon economic considerations, process requirements (e.g., gas stream flow rates and compression requirements), equipment sizing, and manufacturer selection and pricing. The energy required by this system is a function of the final design and configuration and can be provided by electric motors, hydrogen combustion, hydrogen-enriched fuel gas, or other hydrocarbon fuels.

Referring to FIG. 4, the water-gas compression system is comprised of an inlet cooler 20, a first stage suction scrubber 21, a first stage compressor 22, a first stage inter-cooler 23, a second stage suction scrubber 24, a second stage compressor 25, a second stage cooler 26, and a discharge knock-out drum 27. Whether single-stage or multiple-stage compression is used is dependent upon the overall compression ratio, which is determined by the operating pressure of the reformer system that establishes the suction pressure to the water-gas compression system and the outlet pressure that established the discharge pressure of the water-gas compression system. The present invention is not limited to two stages of compressions.

The first step in the water-gas compression system is that the syngas product stream from the syngas and water-gas shift system is cooled to 90° F. in the inlet cooler 20. (This temperature may be up to 120° F. if an air cooler is used instead of cooling water). In a preferred embodiment, the inlet cooler 20 condenses approximately 842 gpm (gallons per minute) of water vapor from the inlet gas stream.

Water vapor is one of the components present in the water-gas product stream. The inlet cooling of this stream prior to compression condenses the bulk of the water vapor in the water-gas to liquid water. The resulting two-phase (gas/water) stream then flows to the first stage suction scrubber 21, where the free water is separated from the gas stream. This minimizes mechanical/corrosion issues and the amount of water that may need to be removed in the downstream processing. The inlet cooling also reduces the compression power requirements for the first stage compressor of the water-gas compression system.

After inlet cooling and liquid water separation, the water-gas from the first stage suction scrubber 21 flows to the first stage compressor 22, where the stream is compressed from 300 psig to 665 psig. (Depending upon the process configuration, this may or may not be the actual inter-stage pressure.) The discharge temperature is 267° F. The pressurized stream is then cooled in the first stage inter-cooler 23, where the stream is cooled to 90° F. (This temperature may be up to 120° F. if an air cooler is used instead of cooling water). Additional water is condensed in this cooler and removed in the second stage suction scrubber 24.

The gas from the second stage suction scrubber 24 flows to the second stage compressor 25, where it is compressed from 660 psig to between 1280 psig and 2200 psig, which increases the temperature of the gas is increased to between 272° F. and 350° F. The compressed gas stream is then cooled to 90° F. (this temperature may be up to 120° F. if an air cooler is used instead of cooling water) in the second stage cooler 26, condensing a small amount of water from the water-gas. This liquid water is removed in the discharge knock-out drum 27. The gas stream from the discharge knock-out drum flows to the carbon dioxide recovery system.

The condensed water streams from the first stage suction scrubber 21, the second stage suction scrubber 24, and the discharge knock-out drum 27 are collected and sent to a process water system (not shown). The water streams separated from the water-gas stream by these scrubbers are combined and preferably treated for use as make-up boiler feed water.

E. Carbon Dioxide Recovery System

Figure 5:
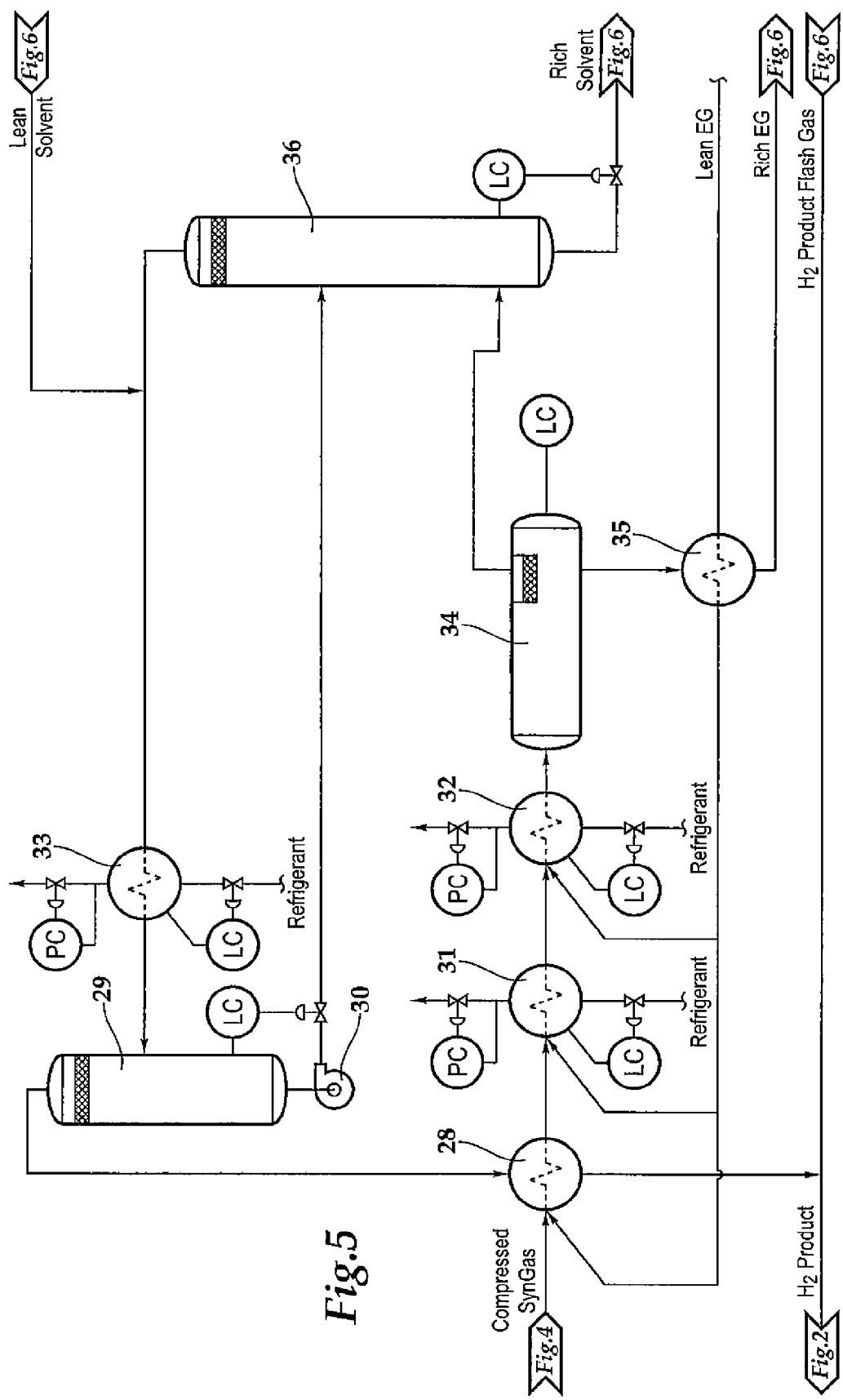
FIG. 5 is a flow diagram of a first part (gas absorption) of the carbon dioxide recovery system of the present invention.
Figure 6:
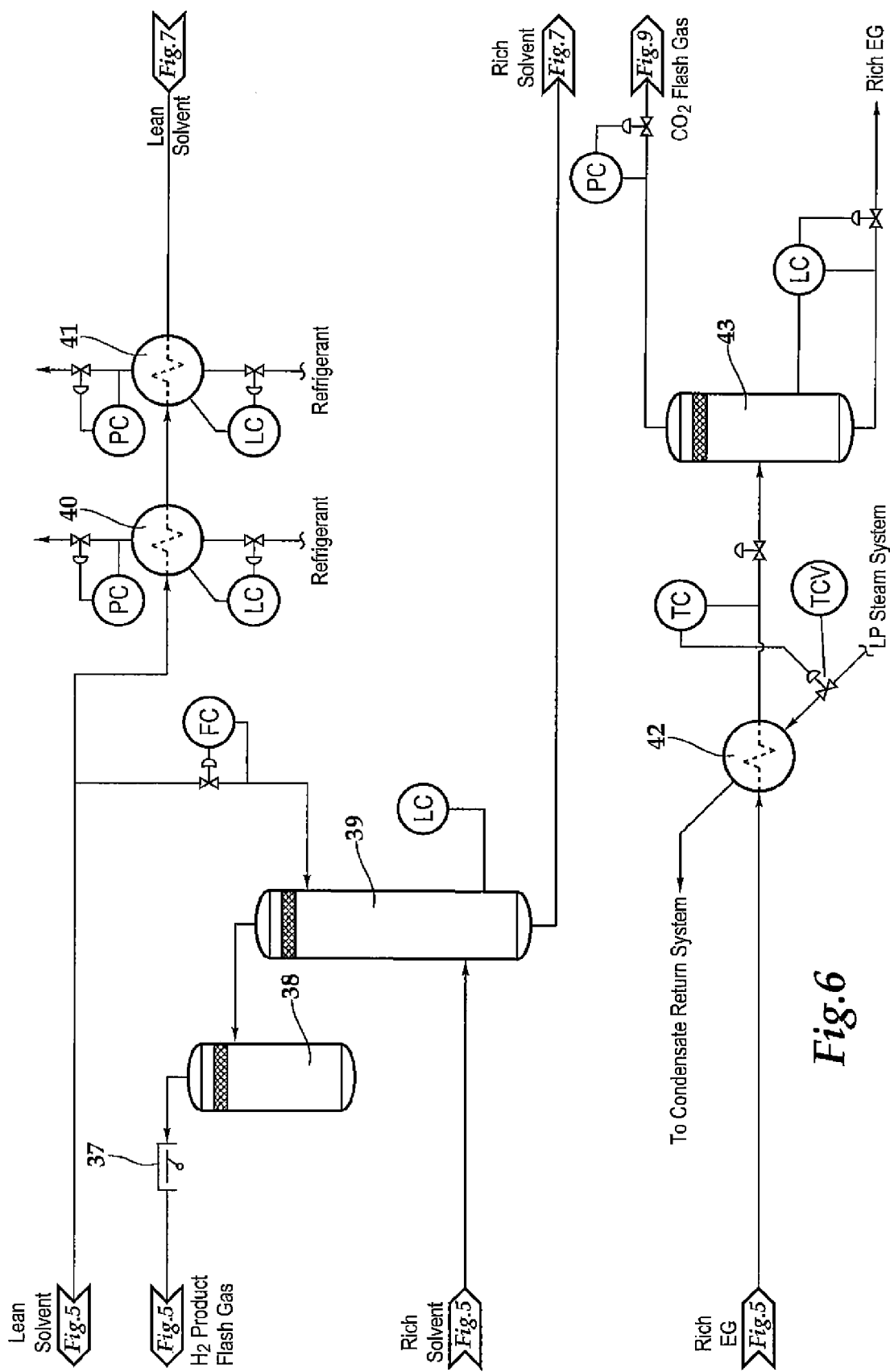
FIG. 6 is a flow diagram of a second part partial rich solvent regeneration and lean solvent cooling) of the carbon dioxide recovery system of the present invention.
Figure 7:
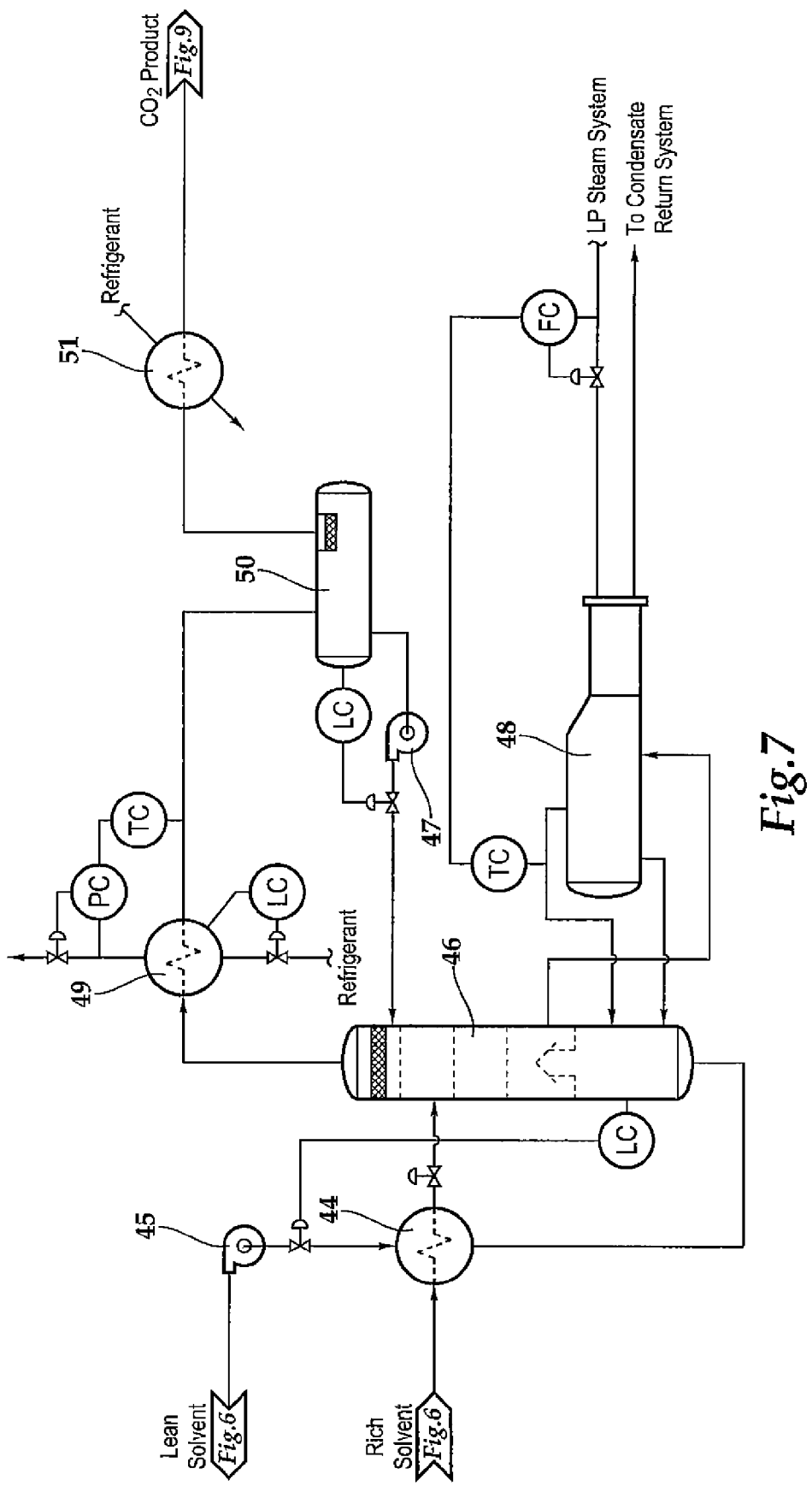
FIG. 7 is a flow diagram of a third part (solvent regeneration) of the carbon dioxide recovery system of the present invention.

FIGS. 5, 6 and 7 are flow diagrams of the first, second and third parts of the carbon dioxide recovery system of the present invention. The carbon dioxide recovery system is designed to separate the carbon dioxide from the hydrogen-rich water-gas stream. This is accomplished by absorbing the carbon dioxide in a carbon dioxide recovery solvent, resulting in a hydrogen-rich gas stream at high pressure. This solvent is a mixture of hydrocarbon liquids, including butanes, pentanes, hexanes, heptanes, octanes, aromatics, and their various isomers, both saturated (alkanes) and unsaturated (alkenes), or it can be any one of these hydrocarbon liquids. In a preferred embodiment, the solvent is commercial grade normal-butane or a mixture of normal-butane and iso-butane.

The carbon dioxide is removed from the solvent using pressure and thermal changes and is produced at medium pressure (ranging from 200-500 psig). In a preferred embodiment, this system uses external refrigeration to aid in the carbon dioxide absorption and low-pressure steam for thermal regeneration of the solvent. Other heat mediums may be used to provide the heat to thermally regenerate the solvent.

Although described herein as the fourth system (after the inlet handling, syngas and water-gas shift, and water-gas compression systems), the carbon dioxide recovery system could be third (before water-gas compression) or fifth (after water-gas compression and dehydration) in the processing sequence. Thus, the order of the systems is not critical. The operating pressures of the absorber in the carbon dioxide recovery system may range from 0 psig to 2200 psig, depending upon the application (for example, if the present invention were used to recover carbon dioxide from low-pressure sources, such as from combustion flue gas, coal-bed methane gas, or other carbon-dioxide bearing sources). The feed temperature for this system will typically range from 90° F. to 120° F., depending upon the means used to cool the water-gas feed stream to the carbon dioxide recovery system.

The carbon dioxide recovery system requires that the water-gas feed stream be dehydrated prior to or in conjunction with cooling the feed stream. In the preferred embodiment, the dehydration system uses a solution of ethylene glycol and water ("ethylene glycol solution") to dehydrate the water-gas feed stream. In alternate embodiments, both of which are described in Section F (Dehydration System), either a methanol solution, absorption (e.g., triethylene glycol), or an adsorption (e.g., molecular sieve, activated alumina, or silica gel) dehydration system is utilized upstream of the carbon dioxide recovery system to remove the water vapor from the water-gas.

The carbon dioxide system is comprised of two separate sections: the gas absorption section and the carbon dioxide recovery solvent regeneration section. The gas absorption section (shown in FIG. 5) uses the carbon dioxide recovery solvent to absorb the carbon dioxide from the water-gas. The carbon dioxide recovery solvent section (shown in FIGS. 6 and 7) removes the carbon dioxide from the carbon dioxide recovery solvent and recycles the carbon dioxide recovery solvent back to the gas absorption section of the carbon dioxide recovery system.

Referring to FIG. 5, the gas absorption section of the carbon dioxide system is comprised of a gas/gas exchanger 28, a high-level gas chiller 31, a low-level gas chiller 32, a glycol separator 34, a primary absorber 36, a presaturator separator 29, a presaturation chiller 33, two presaturator pumps 30 (so that the process can continue to run if one pump breaks), and an ethylene glycol exchanger 35.

Figure 8:
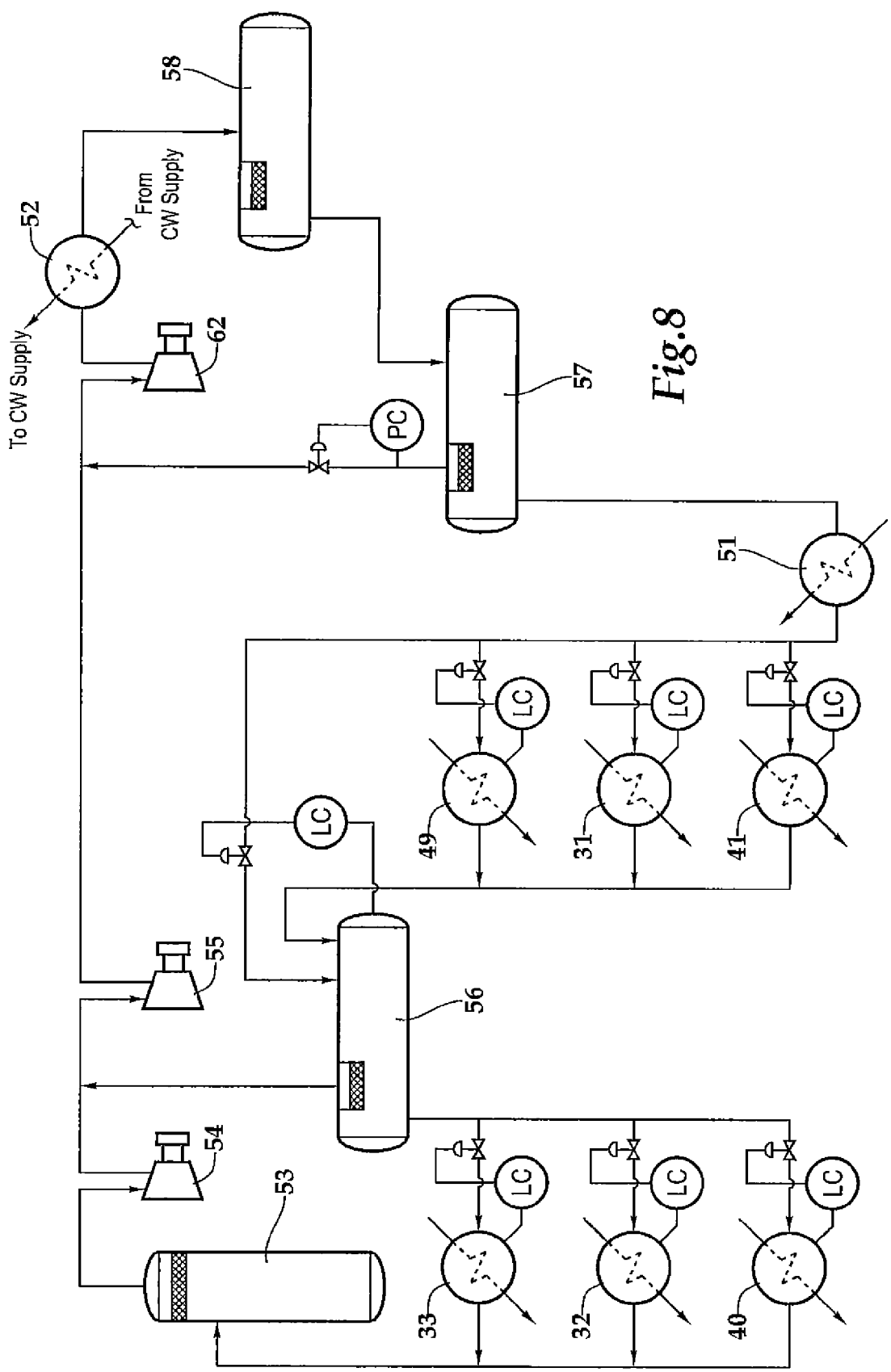
FIG. 8 is a diagram of the refrigeration system used to aid in the absorption of carbon dioxide in connection with the carbon dioxide recovery system of the present invention.

Referring to FIG. 6, the carbon dioxide recovery solvent regeneration section of the carbon dioxide recovery system further comprises a flash absorber 39, a flash gas compressor suction scrubber 38, a flash gas compressor 37, a high-level solvent chiller 41, and a low-level solvent chiller 40. In a preferred embodiment, ethylene glycol is used in connection with the dehydration system (described below), and the present invention comprises an ethylene glycol regeneration system. The following components of the ethylene glycol regeneration system (which is designed to remove the absorbed water from the ethylene glycol solution) are also shown on FIG. 6: an ethylene glycol heater 42 and an ethylene glycol flash separator 43. Referring to FIG. 7, the carbon dioxide recovery solvent regeneration section of the carbon dioxide recovery system further comprises a solvent cross exchanger 44, a solvent stripper 46, a solvent stripper reflux condenser 49, a solvent stripper reflux accumulator 50, two (in case one breaks down) solvent stripper reflux pumps 47, a solvent stripper reboiler 48, two (in case one breaks down) solvent charge pumps 45, and a refrigerant subcooler 51. Referring to FIG. 8, the carbon dioxide recovery system further comprises a refrigeration system.

The ethylene glycol regeneration system (not shown in the figures except for those parts shown on FIG. 6) is designed to remove the absorbed water from the rich (i.e., water-bearing) ethylene glycol solution, converting it to lean (i.e., water-short) ethylene glycol solution; filter and clean the ethylene glycol solution; and pump the lean ethylene glycol solution back to the carbon dioxide recovery system for reuse in dehydrating the water-gas. This system is a closed loop system and is a common, industry-standard design in the gas processing industry.

Referring to FIG. 5, the water-gas feed stream from the water-gas compression system enters the carbon dioxide recovery system at 90° F. and 1270 psia. As is typical for the output of a steam reforming reaction (shown in FIG. 3), this gas flow rate is 452MM SCFD (based on an inlet feed rate of 100MM SCFD to the water-gas shift system), the gas is saturated with water vapor and contains approximately 20% carbon dioxide, 77% hydrogen and 3% other gases (by volume). The water-gas feed stream is cooled to $-35°$ F. and 1255 psia in a series of three exchangers: the gas/gas exchanger 28, the high-level gas chiller 31, and the low-level gas chiller 32. The gas/gas exchanger 28 uses cold hydrogen-rich product residue gas (described below) from the presaturator separator 29 to cool the gas stream from 90° F. to 13° F. The high-level gas chiller 31 uses external refrigeration to cool the gas stream from 13° F. to 0° F., and the low-level gas chiller 32 uses external refrigeration to cool the gas stream from 0° F. to $-35°$ F. This gas cooling reduces the volume of carbon dioxide recovery solvent needed to remove the carbon dioxide from the syngas, thereby reducing overall capital and operating costs.

In a preferred embodiment, three heat exchangers (one gas/gas exchanger and two refrigerant chillers) are used to minimize overall energy requirements of the external refrigeration system. Other heat exchanger arrangements could also be employed without changing the unique aspects of the carbon dioxide recovery system. This includes using refrigeration systems that may lower the temperature of the water-gas feeding the absorber below or above $-35°$ F. depending on the optimization of the capital and operating costs that are affected by the refrigerants selected, carbon dioxide recovery solvent circulation rate, number of theoretical trays of the absorber, and carbon dioxide recovery efficiency. Lean ethylene glycol solution (a mixture of 80 weight percent ethylene glycol and 20 weight percent liquid water) is injected into the inlet gas side of each exchanger pass to prevent hydrate formation; the resulting rich (a mixture of 70 weight percent ethylene glycol and 30 weight percent liquid water) ethylene glycol solution is removed in the glycol separator 34.

The cooled gas then enters the primary absorber 36, where it is counter-currently contacted by carbon dioxide recovery solvent from the presaturator separator 29 (described below). The carbon dioxide recovery solvent absorbs the bulk of the carbon dioxide in the gas. This absorption releases energy, which heats the water-gas in the primary absorber 36 as it travels up and out of the primary absorber. This released energy heats the overhead syngas stream exiting the top of the primary absorber 36 from $-35°$ F. to $-18°$ F. and heats the rich carbon dioxide recovery solvent (carbon dioxide-bearing carbon dioxide recovery solvent) leaving the bottom of the primary absorber 36 from $-35°$ F. to $-8°$ F. The rich carbon dioxide recovery solvent then flows to the carbon dioxide recovery solvent regeneration section of the carbon dioxide recovery system for carbon dioxide recovery.

The overhead water-gas stream, which has become hydrogen-concentrated from the primary absorber 36, is mixed with approximately 3,200 gallons per minute of lean carbon dioxide recovery solvent (regenerated carbon dioxide recovery solvent with less than 5 weight percent carbon dioxide). The absorption of the remaining carbon dioxide from the overhead water-gas stream heats the mixture to $-23°$ F. The mixture is then cooled from $-23°$ F. to $-35°$ F. in the presaturation chiller 33 to remove the heat of absorption. The resulting mixture consists of a cold hydrogen-rich product gas and semi-lean carbon dioxide recovery solvent (carbon dioxide recovery solvent that carries carbon dioxide but has the capacity to remove additional carbon dioxide from the water-gas).

The semi-lean carbon dioxide recovery solvent is separated from this cold hydrogen-rich product gas in the presaturator separator 29 and pumped to the primary absorber 36 by the presaturator pump 30. The cold hydrogen-rich product gas is heated to 75° F. against inlet gas in the gas/gas exchanger 28 and sent to the residue pipeline at 1220 psia or the pipeline operating pressure. If required, a hydrogen compressor can be utilized to inject the hydrogen-rich gas into the gaseous hydrocarbon stream.

The rich ethylene glycol solution that is separated from the chilled water-gas feed stream in the glycol separator 34 absorbs carbon dioxide as well as water. To recover the bulk of the absorbed carbon dioxide, the rich ethylene glycol solution is heated to approximately 150° F. by cross exchange with hot lean ethylene glycol solution from the ethylene glycol regeneration system in the ethylene glycol exchanger 35 (shown on FIG. 5) and with 50 psig steam (or other suitable heat medium) in the ethylene glycol heater 42 (shown on FIG. 6), respectively. The hot rich ethylene glycol solution stream pressure is reduced from about 1220 psig to 435 psig by a level control valve (shown to the left of the ethylene glycol flash separator 43 on FIG. 6), thereby reducing the temperature to 81° F. and releasing the bulk of the absorbed carbon dioxide. The two-phase stream flows to the ethylene glycol flash separator 43, from which the released carbon dioxide flows to the carbon dioxide compression system, while the rich ethylene glycol solution flows to the ethylene glycol regeneration system for removal of the absorbed water.

The rich carbon dioxide recovery solvent leaving the primary absorber 36 is reduced in pressure by a level control valve (shown to the bottom right of the primary absorber 36 on FIG. 5) from about 1230 psig to 435 psig, releasing a large part of the hydrogen and methane gas that was absorbed in the primary absorber 36. This pressure reduction also releases a portion of the absorbed carbon dioxide and vaporized a portion of the carbon dioxide recovery solvent. To minimize solvent and carbon dioxide losses from this operation, this two-phase stream flows to the flash absorber 39, where the released gas is counter-currently contacted by 356 gallons per minute of lean carbon dioxide recovery solvent that has been cooled to −35° F. in the high-level solvent chiller 41 (described below). The cold carbon dioxide recovery solvent absorbs the carbon dioxide and cools the released gas to −18° F. in the flash absorber 39.

Referring to FIG. 6, the overhead gas exiting the top of the flash absorber 39 is hydrogen-rich and has minimal amounts of carbon dioxide and vaporized carbon dioxide recovery solvent present in the stream. This overhead gas stream flows to the flash gas compressor suction scrubber 38 to remove any entrained liquids. Next, it is compressed to 1225 psig by the flash gas compressor 37, which raises the temperature of the gas is raised to 127° F. This gas mixes with the gas exiting the gas/gas exchanger 28, and the mixture then becomes the hydrogen product stream (see FIGS. 2 and 5). In an alternate embodiment, the flash gas may be used as fuel within the present invention and therefore eliminate the need to reduce the size of the flash gas compression system. This hydrogen product stream mixes with the gaseous hydrocarbon bypass stream (previously described and shown on FIG. 2) to become the hydrogen-rich gaseous hydrocarbon product. A lesser portion of this stream is diverted to the burner of the reformer 19 as fuel (FIGS. 2 and 3). The balance of the hydrogen-rich gaseous hydrocarbon product is delivered to end users via pipeline.

Referring to FIG. 7, the rich carbon dioxide recovery solvent from the bottom of the flash absorber 39 is heated to 175° F. by hot lean carbon dioxide recovery solvent from the bottom of the solvent stripper 46 in the solvent cross exchanger 44 before flowing to the solvent stripper 46. The solvent stripper 46 is a full distillation column that removes the absorbed carbon dioxide from the rich carbon dioxide recovery solvent, thereby regenerating the solvent back to the carbon dioxide lean condition where it can then be fed back to the primary absorber 36, the presaturator chiller 33 and the flash absorber 39 for carbon dioxide recovery. Heat for this distillation is supplied by the solvent stripper reboiler 48 at 271° F. and 400 psig, using 50 psig steam as the heating medium to vaporize the carbon dioxide and a portion of the carbon dioxide recovery solvent from the total carbon dioxide recovery solvent stream feeding the reboiler. Alternately, the heat could be supplied from a heat medium system or a direct-fired heater.

Referring to FIG. 7, the overhead gas exiting the top of the solvent stripper 46 then flows to the solvent stripper reflux condenser 49, where it is cooled to 15° F. by external refrigeration (shown in FIG. 8), condensing most of the vaporized carbon dioxide recovery solvent from the carbon dioxide, resulting in a carbon dioxide recovery stream (reflux) containing little carbon dioxide, and a gas stream (carbon dioxide product gas) containing little carbon dioxide recovery solvent. The carbon dioxide recovery solvent is separated from the carbon dioxide product gas in the solvent stripper reflux accumulator 50 and returned to the solvent stripper 46 by the solvent stripper reflux pump 47. The carbon dioxide product gas flows to the refrigerant subcooler 51, where it is heated to 41° F. before flowing to the carbon dioxide compression system with the flash gas from the ethylene glycol flash separator 43 (described above). In an alternate embodiment, the stripper reflux may be operated as a total condenser and the carbon dioxide pumped to the required delivery pressure.

As stated above, in a preferred embodiment, the carbon dioxide recovery solvent is commercial grade normal-butane or a mixture of normal-butane and iso-butane. The physical characteristics of this hydrocarbon provide good absorption of the carbon dioxide and allow the solvent stripper 46 to operate at between 200 and 500 psig (400 psig in a preferred embodiment), producing a carbon dioxide product gas at this pressure. This high pressure greatly reduces the carbon dioxide compression energy requirements when compared to the present art, which typically does not provide a carbon dioxide product gas that is higher than 10-15 psig.

The lean carbon dioxide recovery solvent leaves the solvent stripper 46 at 271° F. and 415 psia and is cooled in the solvent cross exchanger 44 to 34° F. by incoming rich carbon dioxide recovery solvent. The cool, lean carbon dioxide recovery solvent is then pumped to 1255 psia by the solvent charge pump 45 at a flow rate of about 3,780 gallons per minute. The lean carbon dioxide recovery solvent is mixed with about 49 gallons per minute of make-up solvent before flowing to the high-level solvent chiller 41 and the low-level solvent chiller 40. The coolant for these chillers is preferably an external propane refrigerant (shown on FIG. 8), although other refrigeration systems may be utilized. The high-level solvent chiller 41 first reduces the solvent temperature from 40° F. to 0° F., and the low-level solvent chiller 40 further reduces the temperature from 0° F. to −35° F. In the preferred embodiment, two chillers are used to minimize overall energy requirements of the external refrigeration system; however, the present invention is not limited to one, two or three-chiller designs or to any particular method of refrigeration. After exiting the low-level solvent chiller 40, this chilled lean carbon dioxide recovery solvent is then split into three separate streams that flow to the primary absorber 36 and the presaturator chiller 33 (both shown on FIG. 5) and the flash absorber 39 (shown on FIG. 6).

The carbon dioxide recovery system is integrated with the external refrigeration system (shown in FIG. 8). The refrigeration system is a closed-loop system that provides cooling for the various liquid and gas streams in the carbon dioxide recovery system. Various industrial refrigerants could be used for this service, including ethane, propane, butane, ammonia (both compression-cycle and absorption cycle designs), lithium bromide, carbon dioxide, fluorocarbons (Freons), fluorocarbon replacements (e.g., R134a), mixed refrigerants or any other refrigerant available now or in the future that could provide refrigeration at the necessary temperature levels.

In a preferred embodiment, the refrigeration system uses a standard propane refrigerant to provide the necessary cooling services at sub-ambient temperatures. In general, liquid propane (refrigerant) from the refrigeration system is reduced in pressure, which reduces the temperature of the refrigerant. This liquid is vaporized in heat exchangers (chillers), providing cooling for the various liquid and gas streams in the carbon dioxide recovery system. The vaporized refrigerant is compressed to a pressure between 130 psig and 250 psig, depending on the refrigerant condenser cooling media (air, water, or other refrigerants) and ambient conditions, then condensed back to a liquid by either cooling water or by an air cooler. The cycle then repeats, providing continuous cooling to the various liquid and gas streams in the carbon dioxide recovery system.

In a preferred embodiment, liquid refrigerant at 90° F. and 143 psig is stored in the refrigerant accumulator 58, which provides a liquid surge volume for the closed loop system. The liquid refrigerant is reduced to 75 psig through a control valve. The pressure reduction reduces the temperature to 48° F. and vaporizes a lesser portion of the refrigerant. The resulting two-phase system is separated in the refrigerant first stage economizer 57, with the overhead refrigerant gas going to the third stage refrigerant compressor 62.

The liquid refrigerant from the refrigerant first stage economizer 57 is cooled from 48° F. to 44° F. by cold carbon dioxide product gas from the solvent stripper 46 in the refrigerant subcooler 51 before being split into four separate streams through four separate control valves to 19 psig. The pressure reduction reduces the temperature to 5° F. and vaporizes a lesser portion of the refrigerant. Three of the resulting two-phase streams flow to high-level chillers described above: the high-level gas chiller 31 (shown on FIGS. 5 and 8); the high-level solvent chiller 41 (shown on FIGS. 6 and 8); and the solvent stripper reflux condenser 49 (shown on FIGS. 7 and 8). The refrigerant in each of these chillers is vaporized, providing cooling for the various liquid and gas streams in the carbon dioxide recovery system. These three gas refrigerant streams and the fourth two-phase refrigerant stream flow to the refrigerant second stage economizer 56 at 5° F. and 19 psig, where the gas refrigerant is separated from the liquid refrigerant. The gas refrigerant from the refrigerant second stage economizer 56 flows to the suction of the second stage refrigerant compressor 55.

The liquid refrigerant from the refrigerant second stage economizer 56 is split into three separate streams through three separate control valves, which reduces the pressure of the liquid refrigerant to less than 1 psig. This pressure reduction reduces the temperature of the liquid refrigerant to −40° F. and vaporizes a lesser portion of the refrigerant. The three resulting two-phase streams flow to low-level chillers described above: the low-level gas chiller 32 (shown on FIGS. 5 and 8); the low-level solvent chiller 40 (shown on FIGS. 6 and 8); and the presaturator chiller 33 (shown on FIGS. 5 and 8). The refrigerant in each of these chillers is vaporized, providing cooling for the various liquid and gas streams in the carbon dioxide recovery system. These three gas refrigerant streams then flow to the refrigerant compressor first stage suction scrubber 53 at −40° F. and less than 1 psig, where the gas refrigerant is separated from any excess liquid refrigerant. The gas refrigerant from the refrigerant compressor first stage suction scrubber 53 flows to the suction of the first stage refrigerant compressor 54.

F. Dehydration System

The dehydration system removes the water present in the water-gas stream (from the inlet of the carbon dioxide removal system) down to a level that is acceptable for the carbon dioxide recovery system and/or to meet final product delivery requirements. Although described herein as the fifth system, the dehydration step actually occurs in conjunction with the absorption section of the carbon dioxide recovery system.

In a preferred embodiment, and as described above, the dehydration process involves the use of ethylene glycol solution injected directly into the process stream. Alternate dehydration technologies may be used, however. One alternative is to use methanol in the same way as the ethylene glycol by injecting the methanol directly into the process stream. Another alternate dehydration technology involves the use of absorption (triethylene glycol) to remove the water from the water-gas prior to entering the carbon dioxide recovery system. Yet another alternate dehydration technology involves the use of adsorption (molecular sieve, activated alumina or silica gel beds) to remove the water from the water-gas prior to entering the carbon dioxide recovery system. With the preferred embodiment, however, the dehydration system occurs in conjunction with the carbon dioxide recovery system. The preferred embodiment is described below, after which the alternate dehydration technologies are discussed.

In the preferred embodiment, the dehydration system involves injection of lean ethylene glycol solution into the water-gas entering the gas-gas exchanger 28, the high-level gas chiller 31, and the low-level gas chiller 32 of the absorption section of the carbon dioxide recovery system. The lean ethylene glycol solution absorbs the bulk of the water vapor from the water-gas, creating a two-phase stream of dry syngas and rich ethylene glycol solution. The two-phase stream is separated in the glycol separator 34. The dry syngas then flows to the primary absorber 36.

The dehydration system is further comprised of an ethylene glycol heater 42 (shown on FIG. 6), an ethylene glycol flash separator 43 (shown on FIG. 6), and an ethylene glycol regeneration system (not shown). These exchangers are described above in connection with the absorption section of the carbon dioxide recovery system.

As stated above, the ethylene glycol regeneration system is designed to remove the absorbed water from the rich (i.e., water-bearing) ethylene glycol solution, converting it to lean (i.e., water-short) ethylene glycol solution; filter and clean the ethylene glycol solution; and pump the lean ethylene glycol solution back to the carbon dioxide recovery system for reuse in dehydrating the water-gas. This system is a closed loop system and is a common, industry-standard design.

The ethylene glycol regeneration system provides the lean ethylene glycol solution for injection into the gas/gas exchanger 28 (shown on FIG. 5), the high-level gas chiller 31 (shown on FIG. 5), and the low-level gas chiller 32 (shown on FIG. 5). The lean ethylene glycol solution is injected into the inlet of each pass of these three heat exchangers, mixed with the water-gas stream, and then cooled as the two-phase flow (i.e., liquid and gas) flows through the three heat exchangers in sequence: the gas/gas exchanger 28, the high-level gas chiller 31, and the low-level gas chiller 32. The two-phase flow from these three heat exchangers is cooled to −35° F. at 1255 psia. Through the process of mixing and cooling with the water-gas feed stream, the lean ethylene glycol solution absorbs the liquid water condensed from the water-gas stream and protects the carbon dioxide recovery system from both free water and freezing problems. It also removes enough water vapor to meet downstream hydrogen product gas and carbon dioxide product gas specifications. The cold two-phase stream (gas and rich ethylene glycol) is separated in the glycol separator 34 (shown on FIG. 5). The water-gas stream, which is now free of liquid water and the build of the water vapor, then flows to the primary absorber 36 of the carbon dioxide recovery system, and the rich ethylene glycol flows to the ethylene glycol exchanger 35.

The ethylene glycol exchanger 35 is used to cool the warm (240° F.) lean ethylene glycol solution with the cold (−35° F.) rich ethylene glycol solution. This cools the lean ethylene glycol solution to −16° F. by heating the rich ethylene glycol, thus increasing the energy efficiency of the dehydration system and reducing the refrigeration requirements. The cold lean ethylene glycol solution is then injected into the gas/gas exchanger 28, the high-level gas chiller 31, and the low-level gas chiller 32.

A minor amount of carbon dioxide is absorbed by the rich ethylene glycol solution in the gas/gas exchanger 28 and the high-level and low-level gas chillers 31, 32. To recover the absorbed carbon dioxide, the rich ethylene glycol solution is heated to 81° F. in the ethylene glycol heater 42 (shown on FIG. 6). The heat medium for this heater is preferably low-pressure (50 psig) steam, although other heat mediums may be used. The heated rich ethylene glycol solution pressure is reduced to 435 psia via a level control valve upstream of the ethylene glycol flash separator 43 (shown on FIG. 6). The bulk of the carbon dioxide absorbed in the rich ethylene glycol solution is released as vapor as a result of the increase in temperature and reduction of pressure of the rich ethylene glycol solution. The resulting two-phase rich ethylene glycol solution then flows to the ethylene glycol flash separator 43, where the released carbon dioxide vapor is separated from the rich ethylene glycol solution.

The carbon dioxide from the ethylene glycol flash separator 43 (shown on FIG. 6) flows to the carbon dioxide compression system, where it is mixed with the carbon dioxide product gas from the solvent stripper reflux accumulator 50 carbon dioxide recovery system prior to being compressed in the carbon dioxide compression system.

The rich ethylene glycol solution from the ethylene glycol flash separator 43 (shown on FIG. 6) flows to the ethylene glycol regeneration system, where the excess water in the rich glycol stream is removed from the rich ethylene glycol solution to provide lean ethylene glycol solution. The water from the rich ethylene glycol solution is recovered and treated to supply make-up boiler feed water to the syngas and water-gas shift system. The lean ethylene glycol solution is then pumped up to the feed required injection pressure of 1270 psia.

As noted above, other alternate dehydration technologies may be utilized in connection with the present invention. The first involves utilizing the same basic dehydration design but changing the fluid from ethylene glycol to methanol. The second involves the use of triethylene glycol. With this process, the feed gas would be contacted with the triethylene glycol in a counter-current gas/liquid contactor. In this contactor, the feed gas would flow into the bottom to the top of the contactor, where it would be contacted by lean triethylene glycol solution flowing down the contactor. The triethylene glycol would remove the water in the feed stream, and the water-rich triethylene glycol solution would flow out of the bottom of the contactor to a triethylene glycol regeneration system. The triethylene glycol regeneration system would strip the absorbed water from the triethylene glycol solution, and the water vapor would be vented to atmosphere. The lean triethylene glycol would then be recirculated back to the triethylene glycol contactor.

The use of this type of dehydration would eliminate the ethylene glycol solution injection in the absorption section of the carbon dioxide recovery system. It would also eliminate the glycol separator 34, the ethylene glycol heater 42, the ethylene glycol exchanger 35, and the ethylene glycol flash separator 43, and their associated streams.

In an alternate dehydration technology, the process gas stream would enter multiple (two or more) absorption dehydrator beds. These dehydrator beds would be filled with dessicant, and they would operate in a cyclic manner. The selected desiccant would be molecular sieve, activated alumina, silica gel, or similar dessicant, and it would be porous with a high affinity for water.

In this process, the dessicant in the one or more dehydrator bed(s) would adsorb the water vapor from the water-gas, while the one or more dehydrator bed(s) that are saturated with water would be regenerated by heating and/or pressure reduction to remove the adsorbed water. The controls would automatically adjust the feed gas rate to the proper dehydrator bed to provide continual feed stream dehydration.

The water-saturated water-gas would flow downward through the dehydrator bed in the adsorption cycle. The water would be adsorbed within the pores of the dessicant, thereby drying the water-gas stream to the moisture content suitable for gas processing in the carbon dioxide recovery system. Once the desiccant in the dehydrator bed in the adsorption cycle is saturated with water, it would be taken off-line and the water-gas stream would be diverted to other dehydrator beds. The saturated dehydrator bed would be regenerated first by heating it within a preheated portion of the dehydrated water-gas leaving the dehydration system (called "regeneration gas") at either operating pressure or low pressure to drive the adsorbed water off the dessicant into the regeneration gas, making it suitable for reuse in the next cycle, and then cooling it with unheated regeneration gas.

If this dehydration technology were used in connection with the present invention, the regeneration gas exiting the dehydration system could be recycled back into the inlet of the carbon dioxide recovery process.

G. Carbon Dioxide Compression System

Figure 9:
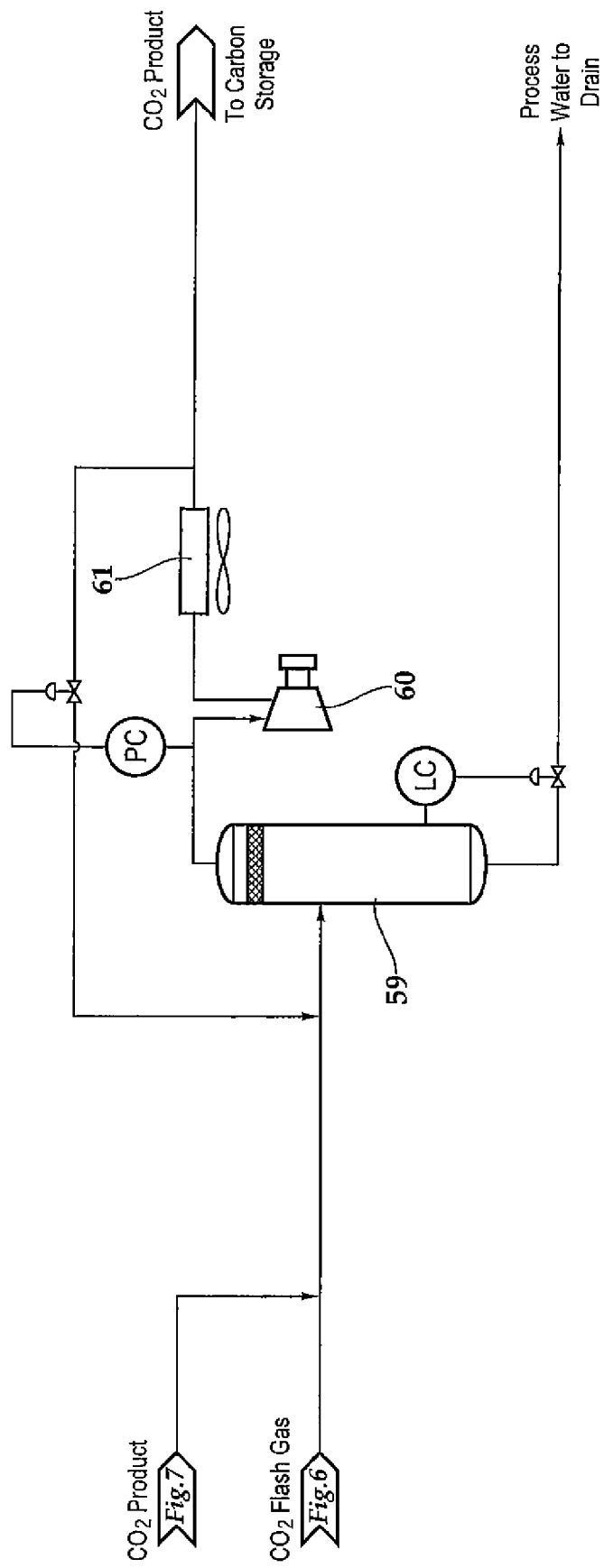
FIG. 9 is a flow diagram of the carbon dioxide compression system of the present invention.

FIG. 9 is a flow diagram of the carbon dioxide compression system of the present invention. The carbon dioxide compression system is designed to compress the various recovered carbon dioxide product stream from the carbon dioxide recovery system to the pressure required by the carbon dioxide storage/sequestration or EOR system. The carbon dioxide compression system inlet pressures may range from 0 psig to 500 psig, depending upon the configuration of the carbon dioxide recovery system. The type of compressor used in this system (i.e., centrifugal, reciprocating, etc.) will depend upon the flows and pressures required for the carbon dioxide sequestration or EOR system, equipment sizing, and manufacturer selection/pricing.

Referring to FIG. 9, the carbon dioxide compression system is comprised of a carbon dioxide compressor suction scrubber 59, a carbon dioxide compressor 60, and a carbon dioxide compressor discharge cooler 61.

In a preferred embodiment, the carbon dioxide product stream from the carbon dioxide recovery system and the carbon dioxide flash gas from the dehydration system are combined and flow to the carbon dioxide compressor suction scrubber 59. The suction scrubber removes any entrained liquids (for example, ethylene glycol or carbon dioxide recovery solvent), and these liquids flow to the high-pressure drain system (not shown). The carbon dioxide gas stream flows to the carbon dioxide compressor 60, where the stream is compressed to 2220 psig or other required delivery pressure established for carbon dioxide transportation, storage, EOR, or other sales. The compressed carbon dioxide stream is then cooled to 120° F. in the carbon dioxide compressor discharge cooler 61 prior to flowing into the carbon dioxide sequestration or EOR system. Alternatives to utilizing a compressor to increase the carbon dioxide pressure to the required delivery conditions include employing a pump.

The specific configurations and operating temperatures, pressures and flow rates discussed above are provided for illustrative purposes only but are not intended to limit the scope of the present invention. Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

REFERENCES

1. "Causes of Global Warming." EcoBridge. http://www.ecobridge.org/content/g_ese.htm.
2. "Climate Change 2007." The Fourth Assessment Report of the United Nations Intergovernmental Panel on Climate Change. http://en.wikipedia.org/wiki/IPCC_Fourth_Assessment_Report.
3. "Alternative & Advanced Fuels." U.S. Department of Energy (Sep. 18, 2007). http://www.eere.energy.gov/afdc/fuels/natural_gas_blends.html.
4. "Program Overview: Hydrogen Enriched Compressed Natural Gas." Westport Innovations Inc. (December 2005). http://www.westport.com/pdf/WPT-HCNG_MED.pdf.
5. "Glossary of Terms." Virginia Department of Mines Minerals and Energy (2006). http://www.dmme.virginia.gov/DE/glossaryterms.shtml.
6. Raabe, Steve. "Research Going Underground." The Denver Post (Feb. 18, 2007) (citing Colorado Geological Survey, partner in Department of Energy's Southwest Regional Partnership on $CO_2$ Sequestration).

We claim:

1. A method of generating hydrogen-enriched fuel gas and carbon dioxide comprising:
   (a) converting hydrocarbon molecules from a gaseous hydrocarbon feed stream into hydrogen and carbon dioxide;
   (b) separating the hydrogen and carbon dioxide;
   (c) blending the hydrogen back into the gaseous hydrocarbon feed stream to generate a hydrogen-enriched fuel gas;
   (d) utilizing the carbon dioxide for storage or sequestration;
   wherein the carbon dioxide is separated from the hydrogen using a carbon dioxide solvent, and
   wherein the carbon dioxide solvent is normal butane or is a mixture of normal-butane and iso-butane.

2. The method of claim 1, wherein as a result of the separation step, each standard cubic foot of the gaseous hydrocarbon feed stream produces between two and four standard cubic feet of a hydrogen product stream and between 0.7 and 0.9 standard cubic feet of a carbon dioxide product stream.

3. The method of claim 1, wherein the hydrogen-enriched fuel gas has a hydrogen concentration ranging from five to 30 mole percent.

4. The method of claim 1, wherein the hydrogen-enriched fuel gas produces less carbon dioxide per energy unit output when combusted than non-hydrogen-enriched natural gas.

5. The method of claim 1, wherein approximately one to eleven percent of the gaseous hydrocarbon feed stream is processed.

6. The method of claim 1, wherein the gaseous hydrocarbon feed stream has a total volume;
   wherein the total volume of the gaseous hydrocarbon feed stream ranges from 100 million standard cubic feet per day to 4500 million standard cubic feet per day; and
   wherein between 10 million standard cubic feet per day and 500 million standard cubic feet per day of the gaseous hydrocarbon feed stream is processed.

7. The method of claim 1, wherein there is an existing natural gas pipeline transportation and distribution system, and
   wherein the hydrogen-enriched fuel gas is transported and distributed using the existing natural gas pipeline system.

8. The method of claim 1, wherein the sequestration is enhanced oil recovery.

9. The method of claim 1, wherein a carbon dioxide recovery solvent is used to separate the carbon dioxide from the hydrogen; and
   wherein the carbon dioxide recovery solvent allows the carbon dioxide to be separated from the hydrogen at a pressure of between 200 and 500 psig.

10. The method of claim 9, wherein total carbon dioxide compression requirements for the storage or sequestration are reduced by 50 to 75 percent as compared to chemical or physical solvent-based carbon dioxide recovery processes that do not utilize the carbon dioxide recovery solvent of the present invention.

11. The method of claim 1, wherein the conversion, separation and blending steps occur on a natural gas transportation and distribution pipeline and not at a point of combustion.

12. The method of claim 1, wherein the conversion, separation and blending steps are all performed prior to combustion of the hydrogen-enriched fuel gas.

13. The method of claim 1, wherein there is an existing natural gas pipeline transportation and distribution system,
   wherein there are a number of existing compressed natural gas fueling facilities; and
   wherein the conversion, separation and blending steps do not require any changes to the existing natural gas pipeline transportation and distribution system other than providing mobile points of consumption with an ability to consume the hydrogen-enriched fuel gas and increasing the number of compressed natural gas fueling facilities to supply the mobile points of consumption with the hydrogen-enriched fuel gas.

14. The method of claim 1, further comprising:
(e) utilizing a portion of the separated hydrogen as a separate fuel product.

15. The method of claim 1, wherein the gaseous hydrocarbon feed stream is pipeline quality natural gas.

16. A system for generating hydrogen-enriched fuel gas and carbon dioxide comprising:
(a) means for converting hydrocarbon molecules from a gaseous hydrocarbon feed stream into hydrogen and carbon dioxide;
(b) means for separating the hydrogen and carbon dioxide;
(c) means for blending the hydrogen back into the gaseous hydrocarbon feed stream to generate a hydrogen-enriched fuel gas; and
(d) means for utilizing the carbon dioxide for storage or sequestration;
wherein the carbon dioxide is separated from the hydrogen using a carbon dioxide solvent, and
wherein the carbon dioxide solvent is normal butane or is a mixture of normal-butane and iso-butane.

17. A method of generating hydrogen and carbon dioxide comprising:
(a) converting hydrocarbon molecules from a gaseous hydrocarbon feed stream into hydrogen and carbon dioxide;
(b) separating the hydrogen and carbon dioxide;
(c) utilizing the hydrogen as a separate product; and
(d) utilizing the carbon dioxide for storage or sequestration;
wherein the carbon dioxide is separated from the hydrogen using a carbon dioxide recovery solvent; and
wherein the carbon dioxide solvent is normal butane or is a mixture of normal-butane and iso-butane.

18. The method of claim 17, wherein a carbon dioxide recovery solvent is used to separate the carbon dioxide from the hydrogen; and
wherein the carbon dioxide recovery solvent allows the carbon dioxide to be separated from the hydrogen at a pressure of between 200 and 500 psig.

* * * * *

UNITED STATES PATENT AND TRADEMARK OFFICE
CERTIFICATE OF CORRECTION

PATENT NO.          : 7,819,932 B2                              Page 1 of 1
APPLICATION NO.     : 12/101087
DATED               : October 26, 2010
INVENTOR(S)         : R. Bret Rhinesmith et al.

It is certified that error appears in the above-identified patent and that said Letters Patent is hereby corrected as shown below:

Title Page
The Assignee is listed as Carbon Blue-Energy, LLC. It should be Carbon Blue Energy, LLC (without a hyphen).

Signed and Sealed this
Twenty-eighth Day of December, 2010

David J. Kappos
*Director of the United States Patent and Trademark Office*